(12) United States Patent
Lee et al.

(10) Patent No.: US 11,133,544 B2
(45) Date of Patent: Sep. 28, 2021

(54) CARBON COMPOSITE, ELECTRODE AND LITHIUM AIR BATTERY COMPRISING THE CARBON COMPOSITE, AND METHOD OF PREPARING THE CARBON COMPOSITE

(71) Applicant: Samsung Electronics Co., Ltd., Suwon-si (KR)

(72) Inventors: Hyunpyo Lee, Seoul (KR); Dongjoon Lee, Suwon-si (KR); Mokwon Kim, Suwon-si (KR); Hyukjae Kwon, Suwon-si (KR); Hyunjin Kim, Seoul (KR); Heungchan Lee, Seongnam-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 328 days.

(21) Appl. No.: 16/106,977

(22) Filed: Aug. 21, 2018

(65) Prior Publication Data

US 2019/0097289 A1    Mar. 28, 2019

(30) Foreign Application Priority Data

Aug. 25, 2017  (KR) .......................... 10-2017-0108135

(51) Int. Cl.
  *H01M 12/02*    (2006.01)
  *H01M 4/133*    (2010.01)
  (Continued)

(52) U.S. Cl.
  CPC ........... *H01M 12/02* (2013.01); *H01M 4/133* (2013.01); *H01M 4/136* (2013.01); *H01M 4/366* (2013.01);
  (Continued)

(58) Field of Classification Search
  CPC ............. H01M 12/02; H01M 10/0525; H01M 10/0565; H01M 12/08; H01M 4/133;
  (Continued)

(56) References Cited

U.S. PATENT DOCUMENTS 7,799,467 B2   9/2010   Delongchamp et al.
8,269,197 B2   9/2012   Goer et al.
(Continued)

FOREIGN PATENT DOCUMENTS

JP         5994982 B2    9/2016
KR    1020130046247 A    5/2013
(Continued)

OTHER PUBLICATIONS

Decision_to_grant_a_European_patent, dated Feb. 13, 2020 (Year: 2020).*

(Continued)

*Primary Examiner* — Alexander Usyatinsky
(74) *Attorney, Agent, or Firm* — Cantor Colburn LLP

(57) ABSTRACT

A carbon composite includes: a carbonaceous core; and a polymer electrolyte membrane disposed on the carbonaceous core, the polymer electrolyte membrane including: a first ionic liquid, a first polymer layer disposed on the carbonaceous core and having a first ionic charge, and a second polymer layer disposed on the first polymer layer and having a second ionic charge opposite to the first charge of the first polymer layer.

31 Claims, 5 Drawing Sheets

(51) Int. Cl.

| | | |
|---|---|---|
| *H01M 4/36* | (2006.01) | |
| *H01M 12/08* | (2006.01) | |
| *H01M 4/96* | (2006.01) | |
| *H01M 4/86* | (2006.01) | |
| *H01M 4/136* | (2010.01) | |
| *H01M 4/587* | (2010.01) | |
| *H01M 8/1023* | (2016.01) | |
| *H01M 8/1025* | (2016.01) | |
| *H01M 8/103* | (2016.01) | |
| *H01M 8/1053* | (2016.01) | |
| *H01M 10/0525* | (2010.01) | |
| *H01M 10/0565* | (2010.01) | |

(52) U.S. Cl.
CPC ......... *H01M 4/587* (2013.01); *H01M 4/8657* (2013.01); *H01M 4/96* (2013.01); *H01M 8/103* (2013.01); *H01M 8/1023* (2013.01); *H01M 8/1025* (2013.01); *H01M 8/1053* (2013.01); *H01M 10/0525* (2013.01); *H01M 10/0565* (2013.01); *H01M 12/08* (2013.01)

(58) Field of Classification Search
CPC ........ H01M 4/136; H01M 4/36; H01M 4/587; H01M 8/1023; H01M 8/1025; H01M 8/103; H01M 8/1053; H01M 4/8657; H01M 4/366; H01M 4/96; Y02E 60/50; Y02E 60/10
See application file for complete search history.

(56) References Cited

U.S. PATENT DOCUMENTS

| | | | |
|---|---|---|---|
| 8,563,168 B2 | 10/2013 | Balsara et al. | |
| 8,980,471 B2 | 3/2015 | Muldoon et al. | |
| 9,617,429 B2 | 4/2017 | Lee et al. | |
| 9,680,191 B2 | 6/2017 | Lee et al. | |
| 2007/0020501 A1 | 1/2007 | Li et al. | |
| 2011/0206994 A1* | 8/2011 | Balsara | H01M 10/0565 429/302 |
| 2014/0234707 A1* | 8/2014 | Muldoon | H01M 4/137 429/211 |
| 2016/0013487 A1* | 1/2016 | Lee | C09C 1/56 429/405 |
| 2016/0064785 A1 | 3/2016 | Kim et al. | |
| 2016/0072071 A1* | 3/2016 | Yumura | H01M 4/48 320/101 |
| 2016/0181585 A1* | 6/2016 | Choi | H01M 50/463 429/403 |
| 2017/0155178 A1 | 6/2017 | Roev et al. | |

FOREIGN PATENT DOCUMENTS

| | | |
|---|---|---|
| KR | 102016007186 A | 1/2016 |
| KR | 1020160025287 A | 3/2016 |
| WO | 2016094301 A1 | 6/2016 |

OTHER PUBLICATIONS

European Search Report for European Patent Application No. 18189506.1 dated Oct. 22, 2018.

Lee et al., "Nanostructured carbon-based electrodes: bridging the gap between thin-film lithium-ion batteries and electrochemical capacitors", Energy & Environmental Science, 4, 2011, pp. 1972-1985.

\* cited by examiner 50 nm

CARBON COMPOSITE, ELECTRODE AND LITHIUM AIR BATTERY COMPRISING THE CARBON COMPOSITE, AND METHOD OF PREPARING THE CARBON COMPOSITE

CROSS-REFERENCE TO RELATED APPLICATION

This application claims priority to and the benefit of Korean Patent Application No. 10-2017-0108135, filed on Aug. 25, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a carbon composite, an electrode including the carbon composite, a lithium-air battery including the carbon composite, and a method of preparing the carbon composite.

2. Description of the Related Art

A lithium-air battery includes an anode that allows incorporation and deincorporation of lithium ions, a cathode that oxidizes and reduces oxygen present in the air, and an electrolyte membrane disposed between the cathode and the anode.

In a lithium-air battery, lithium is used as the anode active material and oxygen is used as the cathode active material. The storage of air as a cathode active material in the lithium-air battery is unnecessary. A lithium-air battery may be manufactured as a high-capacity battery, having a high theoretical energy density per unit weight of 3,500 Watt hours per kilogram (Wh/kg) or greater, which is about ten times greater than the theoretical energy density of non-air lithium ion batteries.

There remains a need for a lithium-air battery having improved properties.

SUMMARY

Provided is a carbon composite coated with multiple polymer layers.

Provided is a porous electrode including the carbon composite.

Provided is a lithium-air battery including the electrode.

Provided is a method of preparing the carbon composite.

Additional aspects will be set forth in part in the description which follows and, in part, will be apparent from the description, or may be learned by practice of the presented embodiments.

According to an aspect of an embodiment, a carbon composite includes: a carbonaceous core; and a polymer electrolyte membrane disposed on the carbonaceous core, the polymer electrolyte membrane including a first ionic liquid, a first polymer layer disposed on the carbonaceous core and having a first ionic charge, and a second polymer layer disposed on the first polymer layer and having a second ionic charge, which is opposite to the first ionic charge of the first polymer layer.

According to an aspect of another embodiment, an electrode includes: a porous layer including a plurality of carbon composites, a carbon composite of the plurality of carbon composites including a carbonaceous core; and a polymer electrolyte membrane disposed on the carbonaceous core, the polymer electrolyte membrane including a first ionic liquid, a first polymer layer disposed on the carbonaceous core and having a first ionic charge, and a second polymer layer disposed on the first polymer layer and having a second ionic charge, which is opposite to the first ionic charge of the first polymer layer.

According to an aspect of another embodiment, a lithium-air battery includes: a cathode; and a lithium-containing anode, wherein the cathode includes a porous layer including a plurality of carbon composites, a carbon composite of the plurality of carbon composites including a carbonaceous core; and a polymer electrolyte membrane disposed on the carbonaceous core, the polymer electrolyte membrane including a first ionic liquid, a first polymer layer disposed on the carbonaceous core and having a first ionic charge, and a second polymer layer disposed on the first polymer layer and having a second ionic charge, which is opposite to the first ionic charge of the first polymer layer.

According to an aspect of another embodiment, a method of preparing a carbon composite includes: coating a second ionic liquid on a carbonaceous core to prepare a coated carbonaceous core; disposing a first polymer layer on the coated carbonaceous core to provide a first polymer layer coated carbonaceous core, wherein the first polymer layer has a first ionic charge opposite to a third ionic charge of the second ionic liquid; disposing a second polymer layer on the first polymer layer to provide a second polymer layer coated carbonaceous core, wherein the second polymer layer has a second ionic charge opposite to the first ionic charge of the first polymer layer; and impregnating the first polymer layer and the second polymer layer with a first ionic liquid to prepare the carbon composite.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
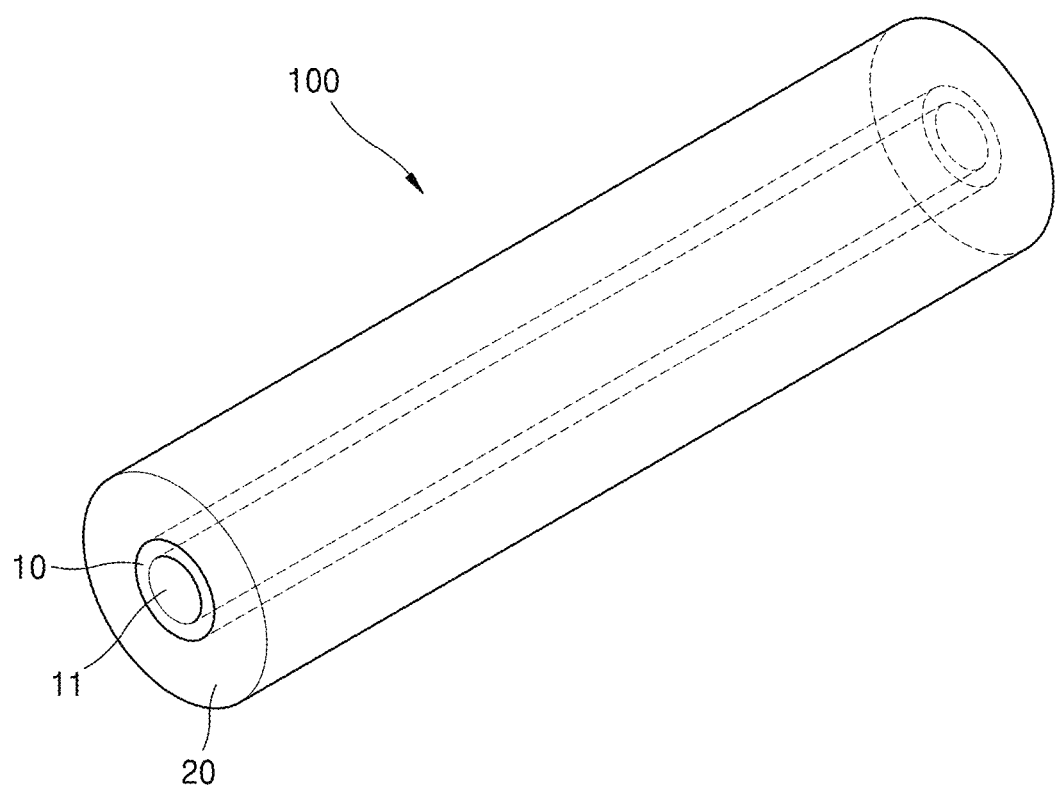
FIG. 1A is a schematic view of a carbon composite, according to an embodiment.

The carbon composite will now be described more fully with reference to the accompanying drawings, in which example embodiments are shown. The disclosed composite may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Or" means "and/or." As used herein, the slash "/" or the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, or 5% of the stated value.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, embodiments of a carbon composite, an electrode, and a lithium-air battery each including the carbon composite, and a method of preparing the carbon composite, will be described in greater detail.

The cathode of a lithium-air battery may include a carbonaceous material and a polymer electrolyte. The carbonaceous material may be easily separated from the polymer electrolyte due to the generation of lithium peroxide which occurs during discharging of the lithium-air battery. Due to the separation of the carbonaceous material from the polymer electrolyte, reaction sites at an interface between the carbonaceous material and the polymer electrolyte may be reduced. Moreover, the lithium peroxide may decompose polymers, such as polyethylene oxide (PEO), in the polymer electrolyte.

Therefore, there is a need for a carbonaceous material which does not separate from the polymer electrolyte when exposed to a discharge product produced during the charging and discharging of the lithium-air battery and also prevents decomposition of the polymer electrolyte through the discharge product.

According to an aspect, a carbon composite includes: a carbonaceous core; and a polymer electrolyte membrane disposed on the carbonaceous core, the polymer electrolyte membrane including a first ionic liquid, a first polymer layer disposed on the carbonaceous core and having a first ionic charge, and a second polymer layer disposed on the first polymer layer and having a second ionic charge, which is opposite to the first ionic charge of the first polymer layer.

In the carbon composite according to one or more embodiments, the polymer electrolyte membrane may be disposed on the carbonaceous core. The polymer electrolyte membrane may be prepared by coating a plurality of polymer layers in a layer-by-layer (LBL) assembly manner on a surface of the carbonaceous core. The plurality of polymer layers are strongly bound together by electrostatic attraction (e.g., an electrostatic bond), and thus separation of the polymer electrolyte membrane from the carbonaceous core caused by a discharge product produced during charge and discharge of a lithium-air battery may be suppressed. Accordingly, loss of reaction sites at an interface between the carbonaceous core and the polymer electrolyte membrane may be prevented. Due to the inclusion of the first ionic liquid in the polymer electrolyte membrane, the carbon composite may have improved ionic conductivity.

Figure 1B:
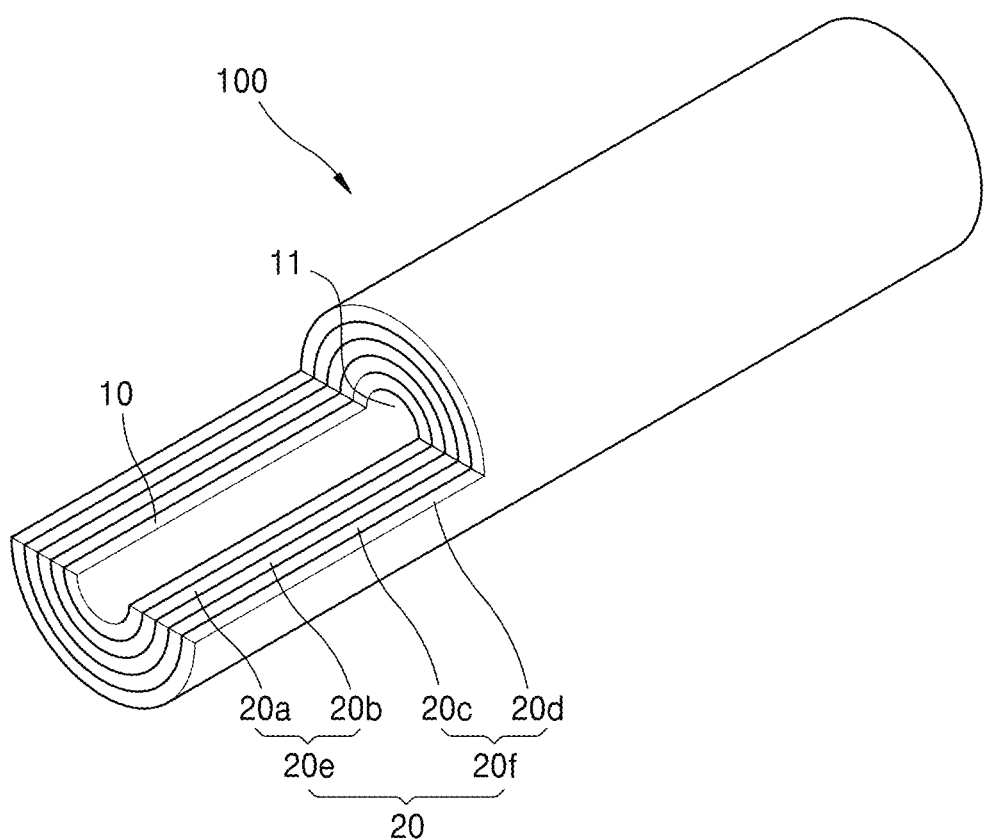
FIG. 1B is a partial cut-away view of a carbon composite, according to an embodiment.

Referring to FIGS. 1A and 1B, a carbon composite 100 according to an embodiment may include a carbonaceous core 10 and a polymer electrolyte membrane 20 disposed on the carbonaceous core 10. The polymer electrolyte membrane 20 may include an ionically charged first polymer layer 20a arranged on and in contact with the carbonaceous core 10, and a second polymer layer 20b arranged on and in contact with the first polymer layer 20a, the second polymer layer 20b ionically charged to have an ionic charge opposite to the ionic charge of the first polymer layer 20a. The polymer electrolyte membrane 20 may further include a third polymer layer 20c arranged on and in contact with the second polymer layer 20b, the third polymer layer 20c ionically charged to have an ionic charge opposite to the ionic charge of the second polymer layer 20b, but the same as the ionic charge of the first polymer layer 20a. The polymer electrolyte membrane 20 may further include a fourth polymer layer 20d arranged on and in contact with the third polymer layer 20c, the fourth polymer layer 20d ionically charged to have an ionic charge opposite to the third polymer layer 20c and the same as the ionic charge of the second polymer layer 20b. Although not illustrated, the polymer electrolyte membrane 20 may further include a fifth polymer layer arranged on and in contact with the fourth polymer layer 20d, the fifth polymer layer ionically charged to have an ionic charge opposite to the fourth polymer layer 20d and the same as the third polymer layer 20c. Although not illustrated, the polymer electrolyte membrane 20 may further include a sixth polymer layer arranged on and in contact with the fifth polymer layer and having an ionic charge opposite to the fifth polymer layer and the same as the ionic charge of the fourth polymer layer 20d. Although not illustrated, the polymer electrolyte membrane 20 may further include at least one polymer layer arranged on the sixth polymer layer.

In an embodiment, the first polymer layer 20a may be ionically charged to have a negative charge, while the second polymer layer 20b may be ionically charged to have a positive charge. Since the first polymer layer 20a and the second polymer layer 20b are strongly bound together by electrostatic attraction, the polymer electrolyte membrane 20 may have improved mechanical strength.

Referring to FIGS. 1A and 1B, the carbonaceous core 10 may be porous. This means that the carbonaceous core 10 may include at least one pore. The carbonaceous core 10 may be a carbonaceous nanostructure including a first pore 11 having an aspect ratio of about 5 or greater. The carbonaceous nanostructure may be a carbonaceous material having a nanostructure. The carbonaceous nanostructure may be a one-dimensional nanostructure. As used herein, a one-dimensional nanostructure means a nanostructure having a size in a first direction which is larger than a size in a second direction perpendicular to the first direction, and larger than a size in a third direction perpendicular to the first and second directions, that is, the size in the first direction substantially determines a shape of the nanostructure. The size in the first direction (e.g., the length) may be larger than the size of the second and third directions (e.g. height and width) by about 5 times or greater, about 10 times or greater, about 50 times or greater, or about 100 times or greater. For example, the sizes in the second and third directions may each independently be about 10 nanometers (nm) or less, and the size in the first direction may be about 50 nm or greater. In an embodiment, the one-dimensional nanostructure may be a carbon nanotube (CNT).

The first pore 11 of the carbonaceous core 10 may have an aspect ratio of about 5 or greater, about 10 or greater, about 15 or greater, about 20 or greater, about 25 or greater, about 30 or greater, about 35 or greater, about 40 or greater, about 45 or greater, about 50 or greater, or about 100 or greater. The first pore 11 of the carbonaceous core 10 may have an aspect ratio of about 1000 or less, about 500 or less, or about 200 or less. The aspect ratio of the first pore 11 may be measured by transmission electron microscope (TEM) images of the carbonaceous core 10. The first pore 11 having an aspect ratio of about 5 or greater in the carbonaceous core 10 is distinguished from a carbonaceous material having a spherical pore. For example, a spherical pore may have an aspect ratio of less than 5, or less than 3, or less than 2.

The first pore 11 of the carbonaceous core 10 may have a diameter of about 0.5 nm to about 3 nm, about 0.5 nm to about 2.5 nm, about 0.5 nm to about 2 nm, about 0.6 nm to about 1.9 nm, about 0.7 nm to about 1.8 nm, about 0.8 nm to about 1.7 nm, about 0.9 nm to about 1.6 nm, or about 1.0 nm to about 1.5 nm. The diameter of the first pore 11 may be measured based on TEM images of the carbonaceous core 10. The first pore 11 having an aspect ratio of about 5 or greater and a diameter of about 0.5 nm to about 3 nm in the carbonaceous core 10, may facilitate the supply of oxygen as a cathode active material into the carbon composite 100.

The carbonaceous core 10 may be non-spherical and substantially sulfur free. The carbonaceous core 10 may be non-spherical by virtue of having the one-dimensional nanostructure. Since the carbonaceous core 10 is substantially sulfur free, e.g., having a sulfur content of less than 1 weight percent (wt %), 0.01 wt %, 0.001 wt %, or 0.0001 wt %, or 0.0000001 wt % to 0.1 wt %, based on a total weight of the core, a side reaction caused by sulfur during the charge/discharge process may be inhibited. The carbonaceous core 10 being non-spherical and sulfur free is distinguished from a carbonaceous material used for a lithium-sulfur battery.

The carbonaceous core 10 may be ionically charged with a second ionic liquid (not shown) having an ionic charge opposite to the ionic charge of the first polymer layer 20a disposed on the carbonaceous core 10. In other words, the second ionic liquid (not shown) may be disposed between the carbonaceous core 10 and the first polymer layer 20a. Since the carbonaceous core 10 has an ionic charge opposite to the ionic charge of the first polymer layer 20a, the first polymer layer 20a may be easily disposed (stacked) on the carbonaceous core 10 and held in place by electrostatic attraction in a layer-by-layer assembly manner. For example, a surface of the carbonaceous core 10 may be charged to have a positive charge by the second ionic liquid, while the first polymer layer 20a may be charged to have a negative charge. Accordingly, the first polymer layer 20a may be strongly bound to a surface of the carbonaceous core 10 by an electrostatic bond, so that separation of the polymer electrolyte membrane 20 from the carbonaceous core 10, which may potentially occur due to the production of a discharge product during charging and discharging of a lithium-air battery, may be suppressed.

The polymer electrolyte membrane 20 may have a thickness of about 0.5 nanometers (nm) to about 1,000 nm, about 1.0 nm to about 500 nm, about 1.0 nm to about 400 nm, about 1.0 nm to about 300 nm, about 1.0 nm to about 200 nm, about 1.0 nm to about 100 nm, about 1.0 nm to about 50 nm, or about 1.0 nm to about 30 nm. The thickness of the polymer electrolyte membrane 20 may be determined according to the number of polymer layers. As the number of polymer layers is increased, the polymer electrolyte membrane 20 may have an increased thickness. Since the polymer electrolyte membrane 20 is formed in a LBL manner, the polymer electrolyte membrane 20 may be coated to have a uniform thickness. For example, a standard deviation of thickness of the polymer electrolyte membrane 20 on the carbonaceous material may be about ±50% or less, about ±40% or less, about ±30% or less, about ±20% or less, about ±10% or less, or about ±5% or less of the thickness of the polymer electrolyte membrane 20.

A polymer bilayer 20e of the polymer electrolyte membrane 20, consist essentially or, or consist of two polymer layers in contact with each other. As shown in FIG. 1B, a first polymer bilayer 20e consists of the first polymer layer 20a and the second polymer layer 20b in direct contact with each other and a second polymer bilayer 20f consists of the third polymer layer 20c and the fourth polymer layer 20d in direct contact with each other.

The first and second polymer layers 20a and 20b, may have a thickness of about 0.5 nm to about 5 nm, about 0.6 nm to about 4.8 nm, about 0.7 nm to about 4.5 nm, or about 0.8 nm to about 4.0 nm. The thicknesses of polymer bilayers 20e and 20f may be determined according to the thicknesses of the first and second polymer layers 20a and 20b constituting the polymer bilayer 20e and the thicknesses of the third and fourth polymer layers 20c and 20d constituting the polymer bilayer 20f, respectively. The thicknesses of the first, second, third, and fourth polymer layers 20a, 20b, 20c, and 20d may be adjusted according to a type and concentration of coated polymer.

The polymer bilayers 20e and 20f may be alternately stacked so that the polymer electrolyte membrane includes a plurality of polymer bilayers. The number of polymer bilayers 20e and 20f in the polymer electrolyte membrane 20 may have a linear proportional relationship with a total amount of the polymer electrolyte membrane 20 in the carbon composite 100. As the number of polymer bilayers 20e and 20f in the polymer electrolyte membrane 20 is increased, there is a corresponding linear increase in the total amount of the polymer electrolyte membrane 20 in the carbon composite 100. Accordingly, the number of polymer bilayers 20e and 20f in the polymer electrolyte membrane 20 may be estimated by measuring the total amount of the polymer electrolyte membrane 20 in the carbon composite 100.

In some other embodiments, the number of polymer bilayers 20e and 20f in the polymer electrolyte membrane 20 may have a non-linear relationship with the amount of the polymer electrolyte membrane 20 in the carbon composite 100. That is, the number of polymer bilayers may not have a linear relationship with the amount of the polymer electrolyte membrane in the composite. In an embodiment, the number of polymer bilayers formed at an initial stage in the formation of the polymer electrolyte membrane 20 may have a non-linear proportional relationship with the amount of the polymer electrolyte membrane 20 in the carbon composite 100, while the number of polymer bilayers formed at a later stage in the polymer electrolyte membrane 20 may have a linear proportional relationship with the polymer electrolyte membrane 20 in the carbon composite 100. In another embodiment, the number of polymer bilayers formed at an initial stage in the formation of the polymer electrolyte membrane 20 may have a linear proportional relationship with the amount of the polymer electrolyte membrane 20 in the carbon composite 100, while the number of polymer bilayers formed at a later stage in the formation of the polymer electrolyte membrane 20 may have a non-linear proportional relationship with the total amount of the polymer electrolyte membrane in the composite.

In the carbon composite 100 according to one or more embodiments, the amount of the polymer electrolyte membrane 20 may be about 0.1 part by weight to about 100 parts by weight, about 0.2 parts by weight to about 90 parts by weight, about 0.5 parts by weight to about 80 parts by weight, about 1.0 part by weight to about 70 parts by weight, about 2.0 parts by weight to about 60 parts by weight, about 3.0 parts by weight to about 50 parts by weight, about 4.0 parts by weight to about 50 parts by weight, about 5.0 parts by weight to about 40 parts by weight, about 10 parts by weight to about 30 parts by weight, or about 15 parts by weight to about 25 parts by weight, with respect to 100 parts by weight of the carbonaceous core 10. When the content of the polymer electrolyte membrane 20 is too high, the thickness of the polymer electrolyte membrane 20 may be excessively increased, resulting in increased lithium ion transfer paths and increased internal resistance, and thus deteriorating the high-rate characteristics of a lithium-air battery.

A polymer in the polymer electrolyte membrane 20 may be electrochemically stable in a voltage range of about 1.0 volt (V) to about 4.5 V with respect to lithium metal, and may be substantially inert to lithium peroxide (e.g., $Li_2O$, $Li_2O_2$, or the like). For example, the polymer in the polymer electrolyte membrane 20 may be electrochemically stable in a voltage range of, for example, about 1.3 V to about 4.5 V, about 1.5 V to about 4.5 V, about 1.5 V to about 4.3 V, about 1.7 V to about 4.3 V, or about 2.0 V to about 4.3 V, with respect to lithium metal.

Polymers such as a polyethylene oxide (PEO) may be decomposed by lithium peroxide. Further, polymers such as polyacrylic acid (PAA), polystyrene sulfonate (PSS), polyacrylonitrile (PAN), polymethylmethacylate (PMMA), polyvinylpyrrolidone (PVP), polyvinylidene fluoride (PVDF), and polyvinylidene fluoride-hexafluoropropylene (PVDF-HFP) may be not electrochemically stable in a voltage range of about 1 V to about 4.5 V with respect to lithium metal.

The polymer in the polymer electrolyte membrane 20 may include a cationic polymeric ionic liquid, an anionic polymeric ionic liquid, a zwitterionic polymeric ionic liquid, a fluorine polymer including an anionic group, or a combination thereof.

A cationic polymeric ionic liquid may be a polymeric ionic liquid including a cation in the backbone and an anion as a counter ion. For example, the cationic polymeric ionic liquid may have a structure of the following structures 1 to 33.

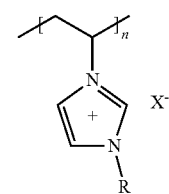

1

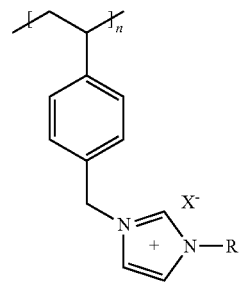

2

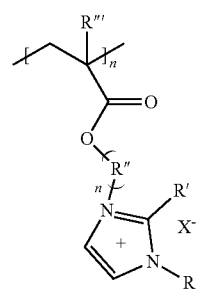

3

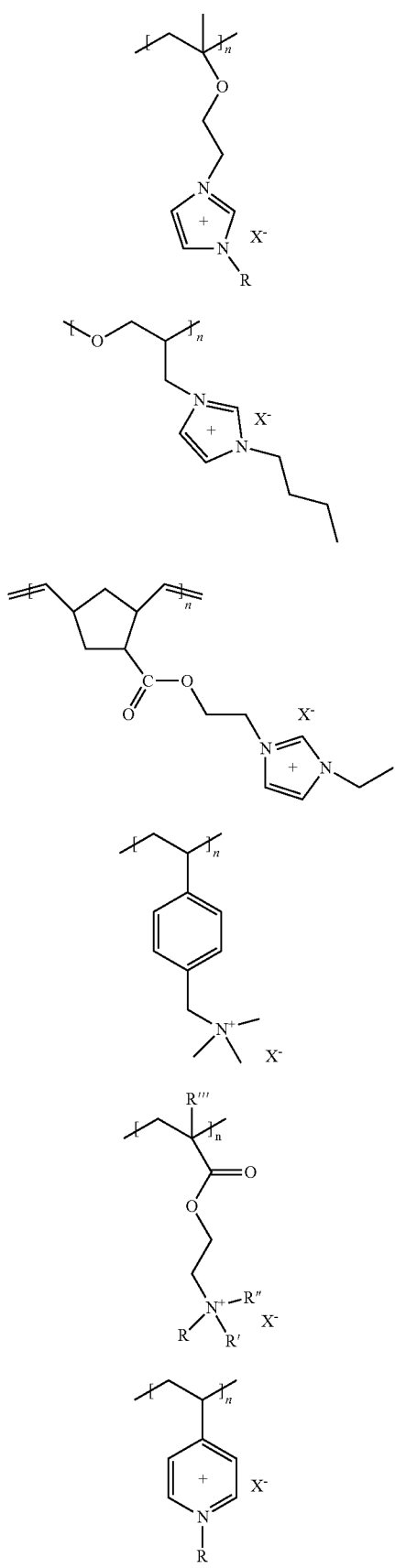
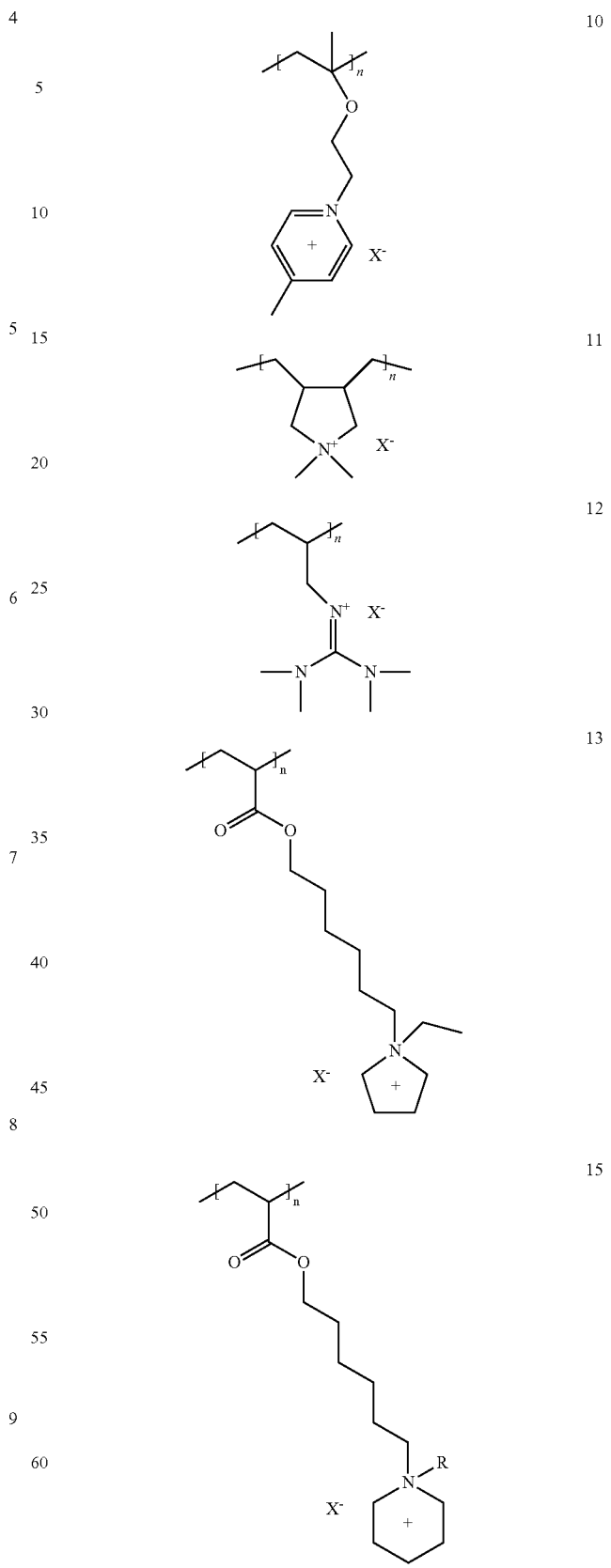
R = H, or alkyl
X⁻ = BF₄, PF₆, TFSI, CF₃SO₃, SCN, etc..

16
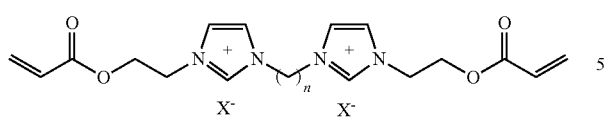
17
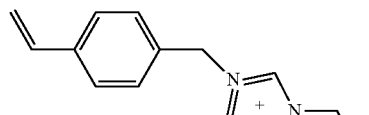
18
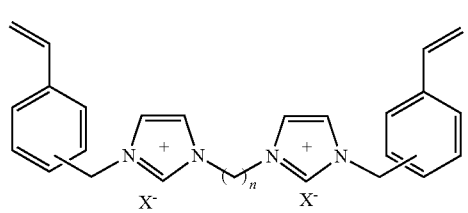
19
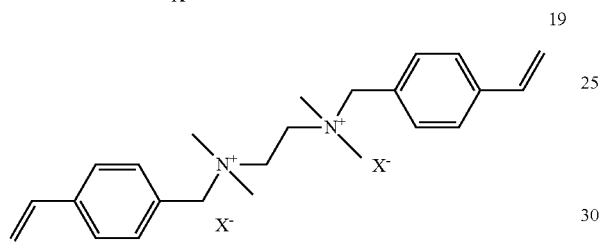
20
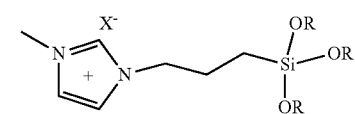
21
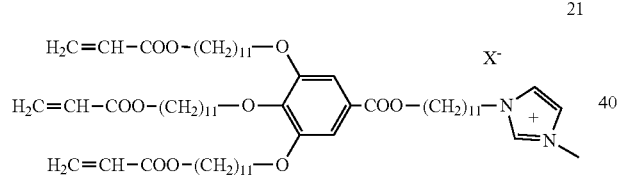
22
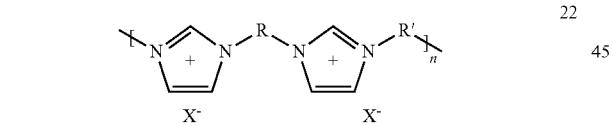
23
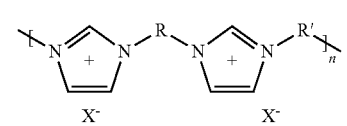
24
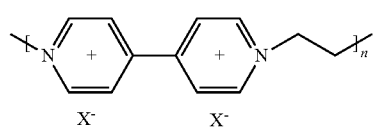
25
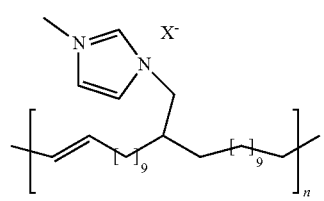
26
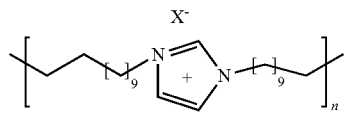
27
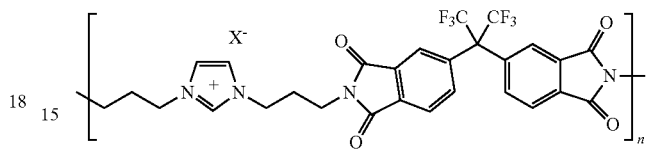
28
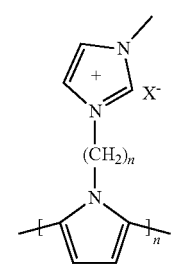
29
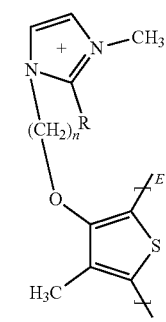
30
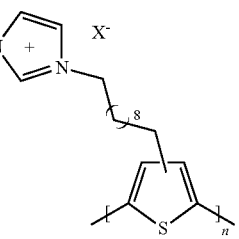
31
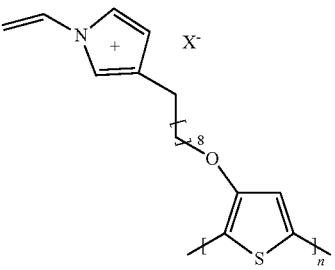
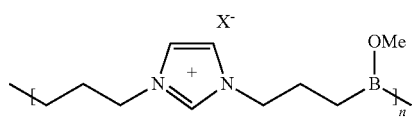

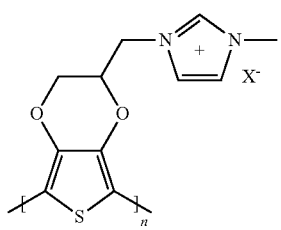

32

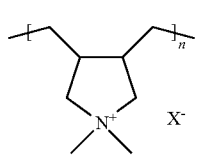

33

In structures 1 to 33, R is H or a C1 to C20 alkyl, X is $BF_4$, $PF_6$, bis(trifluoromethane)sulfonimide (TFSI), $CF_3SO_3$, or SCN, and when n is the number of —$CH_2$— units, n is an integer of 1 to 20, or when m or n is the number of repeat units in the polymeric ionic liquid, n or m has an average value of greater than 2, e.g., 10 to 3000.

An anionic polymeric ionic liquid may be a polymeric ionic liquid including an anion in the backbone and a cation as a counter ion. For example, the anionic polymeric ionic liquid may have a structure of the following structures 34 to 41.

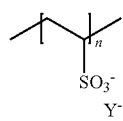

34

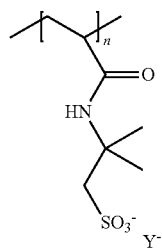

35

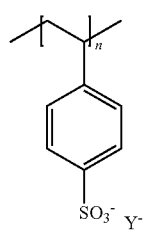

36

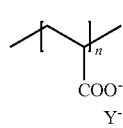

37

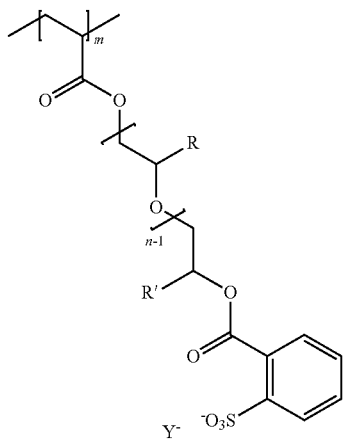

38

39

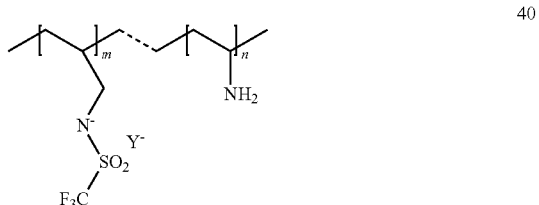

40

41

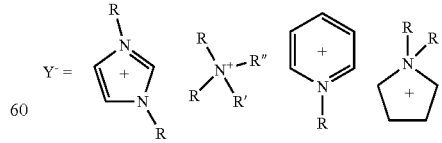

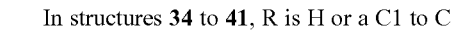

In structures 34 to 41, R is H or a C1 to C20 alkyl, and n is an integer of 1 to 20.

A zwitterionic polymeric ionic liquid may be a polymeric ionic liquid including zwitterionic ions in the backbone and a cation and/or an anion as a counter ion. For example, the zwitterionic polymeric ionic liquid may have a structure of the following structures 42 to 47.

42
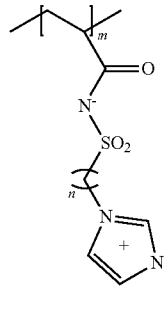

43
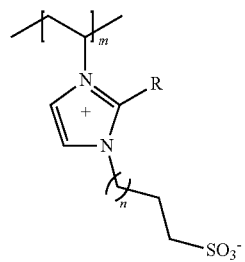

44
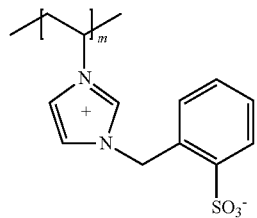

45
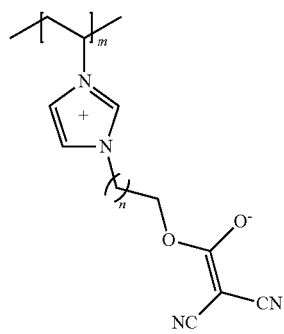

46
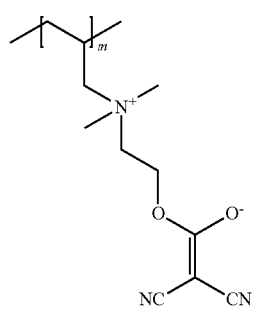

47
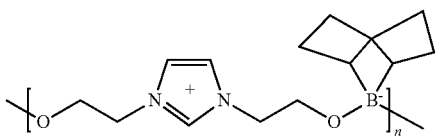

In structures 42 to 47, R is H or a C1 to C20 alkyl, and when n is the number of —CH$_2$— units, n is an integer of 1 to 20, or when n or m is the number of repeat units in the polymeric ionic liquid, n or m has an average value of greater than 2, e.g, 10 to 3000.

For example, the cationic polymeric ionic liquid in the polymer electrolyte membrane 20 may be represented by Formula 1.

Formula 1
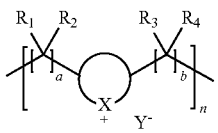

In Formula 1,

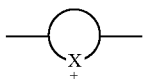

is a C2-C30 ring system having 3 to 30 atoms including at least one heteroatom X, and may include an unsubstituted or substituted heterocycloalkyl or an unsubstituted or substituted heteroaryl, and optionally a unsubstituted or substituted cycloalkyl or aryl in addition;

X is —N(R$_2$)(R$_3$), —N(R$_2$), —P(R$_2$), or —P(R$_2$)(R$_3$);

R$_1$ to R$_4$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 hetero aryloxy group, an unsubstituted or substituted C4-C30 cycloalkyl group, an unsubstituted or substituted C3-C30 heterocycloalkyl group, or an unsubstituted or substituted C2-C100 alkylene oxide group;

Y$^-$ is an anion;

a and b are each independently be an integer of 1 to 5; and n is an integer of 500 to 2800.

In an embodiment,

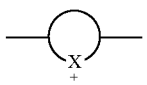

in Formula 1 may be represented by Formula 2.

Formula 2

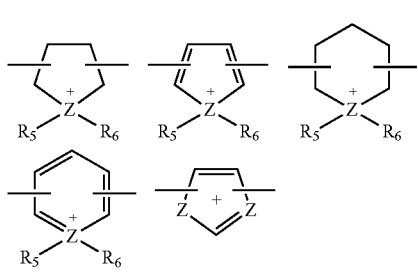

In Formula 2, Z is N, S, or P, and $R_5$ and $R_6$ are each independently a hydrogen, a C1-C30 alkyl group, a C1-C30 alkoxy group, a C6-C30 aryl group, a C6-C30 aryloxy group, a C3-C30 heteroaryl group, a C3-C30 heteroaryloxy group, a C4-C30 cycloalkyl group, a C3-C30 heterocycloalkyl group, or C2-C100 alkylene oxide group.

For example, the cationic polymeric ionic liquid of Formula 1 in the polymer electrolyte membrane 20 may be a cationic polymeric ionic liquid represented by Formula 3.

Formula 3

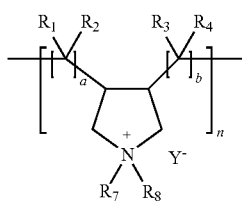

In Formula 3, $R_1$ to $R_8$ are each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group; $Y^-$ includes $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^{31}$, $ClO_4^-$, $CF_3SO_3^-$, $CF_3CO_2^-$, $(C_2F_6SO_2)_2N^-$, $(C_2F_6SO_2)(CF_3SO_2)N^-$, $(CF_3SO_2)_2N^-$, or a combination thereof; a and b are each independently be an integer of 1 to 5; and n is an integer of 500 to 2800.

In an embodiment, the polymer electrolyte membrane may include poly(diallyldimethylammonium)chloride), poly(diallyldimethylammonium) bis(trifluoromethanesulfonyl)imide, or a combination thereof. In another embodiment, the polymer electrolyte membrane may include a lithiated NAFION®, for example, Li-NAFION® as a fluorine polymer including an anionic group. These polymers may be electrochemically stable in a voltage range of about 1.0 V to about 4.5 V with respect to lithium metal, and may be substantially inert to a lithium peroxide, such as $Li_2O$, $Li_2O_2$, and the like.

The first ionic liquid and the second ionic liquid in the polymer electrolyte membrane 20 may be the same or different from one another.

For example, the first ionic liquid and the second ionic liquid may each independently represented by Formula 4 or Formula 5.

Formula 4

In Formula 4,

is a C2-C30 ring system having 2 to 30 member atoms, including at least one hetero atom X, and is a heterocycloalkyl or a heteroaryl ring, and optionally further comprises a cycloalkyl or aryl ring; X is $-N(R_2)(R_3)$, $-N(R_2)$, $-P(R_2)$, or $-P(R_2)(R_3)$; and $Y^-$ is an anion.

Formula 5

$$R_{11} \diagup \overset{X}{\underset{+}{\phantom{X}}} \quad Y^-$$

In Formula 5, X is $-N(R_2)(R_3)$, $-N(R_2)$, $-P(R_2)$, or $-P(R_2)(R_3)$; $R_{11}$ is each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 hetero aryloxy group, an unsubstituted or substituted C4-C30 cycloalkyl group, an unsubstituted or substituted C3-C30 heterocycloalkyl group, or an unsubstituted or substituted C2-C100 alkylene oxide group; and $Y^-$ is an anion.

For example, $$\underset{+}{\overset{X}{\bigcirc}}$$

in Formula 4 may be a cation represented by Formula 6, and $$R_{11} \diagup \overset{X}{\underset{+}{\phantom{X}}}$$

in Formula 5 may be a cation represented by Formula 7:

Formula 6

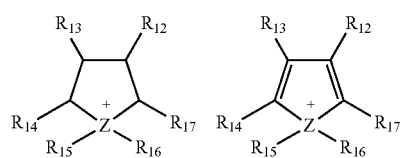

-continued

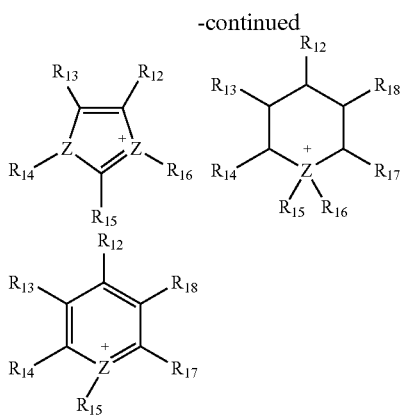

In Formula 6, Z is nitrogen (N) or phosphorus (P); and $R_{12}$ to $R_{18}$ are each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 hetero aryloxy group, an unsubstituted or substituted C4-C30 cycloalkyl group, an unsubstituted or substituted C3-C30 heterocycloalkyl group, or an unsubstituted or substituted C2-C100 alkylene oxide group.

Formula 7

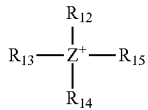

In Formula 7, Z is nitrogen (N) or phosphorus (P); and $R_{12}$ to $R_{15}$ are each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 hetero aryloxy group, an unsubstituted or substituted C4-C30 cycloalkyl group, an unsubstituted or substituted C3-C30 heterocycloalkyl group, or an unsubstituted or substituted C2-C100 alkylene oxide group.

For example, the first ionic liquid and the second ionic liquid may each independently include an cation including an ammonium cation, an imidazolium cation, a piperidinium cation, a pyridinium cation, a pyrrolidinium cation, a phosphonium cation, a sulfonium cation, or a combination thereof, and an cation anion including a bis(trifluoromethylsulfonyl)imide anion, a bromide anion, a chloride anion, a dicyanamide anion, a hexafluorophosphate anion, a phosphate anion, a sulfate anion, an iodide anion, a sulfonate anion, a nitrate anion, a tetrafluoro borate anion, a thiocyanate anion, a triflate anion, or a combination thereof.

For example, the first ionic liquid and the second ionic liquid may each independently be [emim]Cl/AlCl$_3$, [bmpyr]NTf$_2$, [bpy]Br/AlCl$_3$, [choline]Cl/CrCl$_3$.6H$_2$O, [Hpy(CH$_2$)$_3$pyH][NTf$_2$]$_2$, [emim]OTf/[hmim]I, [choline]Cl/HOCH$_2$CH$_2$OH, [Et$_2$MeN(CH$_2$CH$_2$OMe)]BF$_4$, [Bu$_3$PCH$_2$CH$_2$C$_8$F$_{17}$]OTf, [bmim]PF$_6$ (wherein bmim=butyl methyl imidazolium), [bmim]BF$_4$, [omim]PF$_6$, [Oct$_3$PC$_{18}$H$_{37}$]I, [NC(CH$_2$)$_3$mim]NTf$_2$, [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph] NTf$_2$, [pmim][(HO)$_2$PO$_2$], [b(6-Me)quin]NTf$_2$, [bmim][Cu$_2$Cl$_3$], [C$_{18}$H$_{37}$OCH$_2$mim]BF$_4$, [heim]PF$_6$, [mim(CH$_2$CH$_2$O)$_2$CH$_2$CH$_2$mim][NTf$_2$]$_2$, [obim]PF$_6$, [oquin]NTf$_2$, [hmim][PF$_3$(C$_2$F$_5$)$_3$], [C$_{14}$H$_{29}$mim]Br, [Me$_2$N(C$_{12}$H$_{25}$)$_2$]NO$_3$, [emim]BF$_4$, [mm(3-NO$_2$)im][dinitrotriazolate], [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, [Hex$_3$PC$_{14}$H$_{29}$]N(CN)$_2$, or a combination thereof. In the above formulas, "Hpy" or "pyH"" is 1-hexylpyridinium; "emim" is ethyl methyl imidazolium; "bmpyr" is butyl methyl pyridinium; "bpy" is 4,4'-bipyridine; "NTf$_2$" is bis(trifluoromethanesulfon)imide; "hmim" is hexyl methyl imidazolium; Et is ethyl; Me is methyl' Pr is propyl; Bu is butyl; Ph is phenyl; Oct is octyl; Hex is hexyl; "OTf" is trifluoromethane sulfonate; "omim" is octyl methyl imidazolium; "mim" is methyl imidazolium; "pmim" propyl methyl imidazolium; "heim" is hexyl ethyl imidazolium; "bquin" is butyl quinolinium; "mm(3-NO$_2$)im" is 1,3-dimethyl(3-NO$_2$)imidazolium; "oquin" is octyl quinolinium; and "obim" is octyl butyl imidazolium. However, embodiments are not limited thereto. Any materials suitable for use as ionic liquids may be used.

For example, the first ionic liquid and the second ionic liquid may each independently be Pyr13FSI (N-propyl-N-methyl pyrrolidinium bis(fluorosulfonyl)imide), Pyr14FSI (N-butyl-N-methyl pyrrolidinium bis(fluorosulfonyl)imide), Pyr13TFSI (N-propyl-N-methyl pyrrolidinium bis(trifluoromethanesulfonyl)imide), Pyr14TFSI (N-butyl-N-methyl pyrrolidinium bis(trifluoromethanesulfonyl)imide), Pyr13TBETI (N-propyl-N-methyl pyrrolidinium bis(pentafluoroethanesulfonyl)imide), Pyr14BETI (N-butyl-N-methyl pyrrolidinium bis(pentafluoroethanesulfonyl)imide), Pyr13IM14 (N-propyl-N-methyl pyrrolidinium bis(nonafluorobutyl-sulfonyl)imide), or Pyr14IM14 (N-butyl-N-methyl pyrrolidinium bis(nonafluorobutyl-sulfonyl)imide). A combination comprising at least one of the foregoing may also be used. However, embodiments are not limited thereto. Any ionic liquids available in the art may be used.

According to another aspect, an electrode includes a porous layer including a plurality of carbon composites, a carbon composite of the plurality of carbon composites including: a carbonaceous core; and a polymer electrolyte membrane disposed on the carbonaceous core, the polymer electrolyte membrane including a first ionic liquid, a first polymer layer disposed on the carbonaceous core having a first ionic charge, and a second polymer layer disposed on the first polymer layer having a second ionic charge which is opposite to the first ionic charge of the first polymer layer. In an embodiment, each carbon composite of the plurality of carbon composites includes the carbonaceous core and the polymer electrolyte membrane disposed on the carbonaceous core.

The electrode according to one or more embodiments may include a carbon composite including a polymer electrolyte membrane prepared by coating a plurality of polymer layers on the carbonaceous core in a layer-by-layer (LBL) assembly manner.

The first ionic liquid is also included in the polymer electrolyte membrane of the composite. Accordingly, the electrode according to one or more embodiments may include a reduced content of the polymer electrolyte membrane, as compared to an electrode prepared by simply mixing a carbonaceous core and a polymer electrolyte, and thus may have an increased energy density per weight of the electrode. Without being limited by theory, it is understood that due to a reduced number of transfer paths of lithium ions from a surface of the electrode to the carbonaceous core, a lithium-air battery including the electrode may have improved cycle characteristics, and in particular, improved high-rate characteristics.

Figure 2:
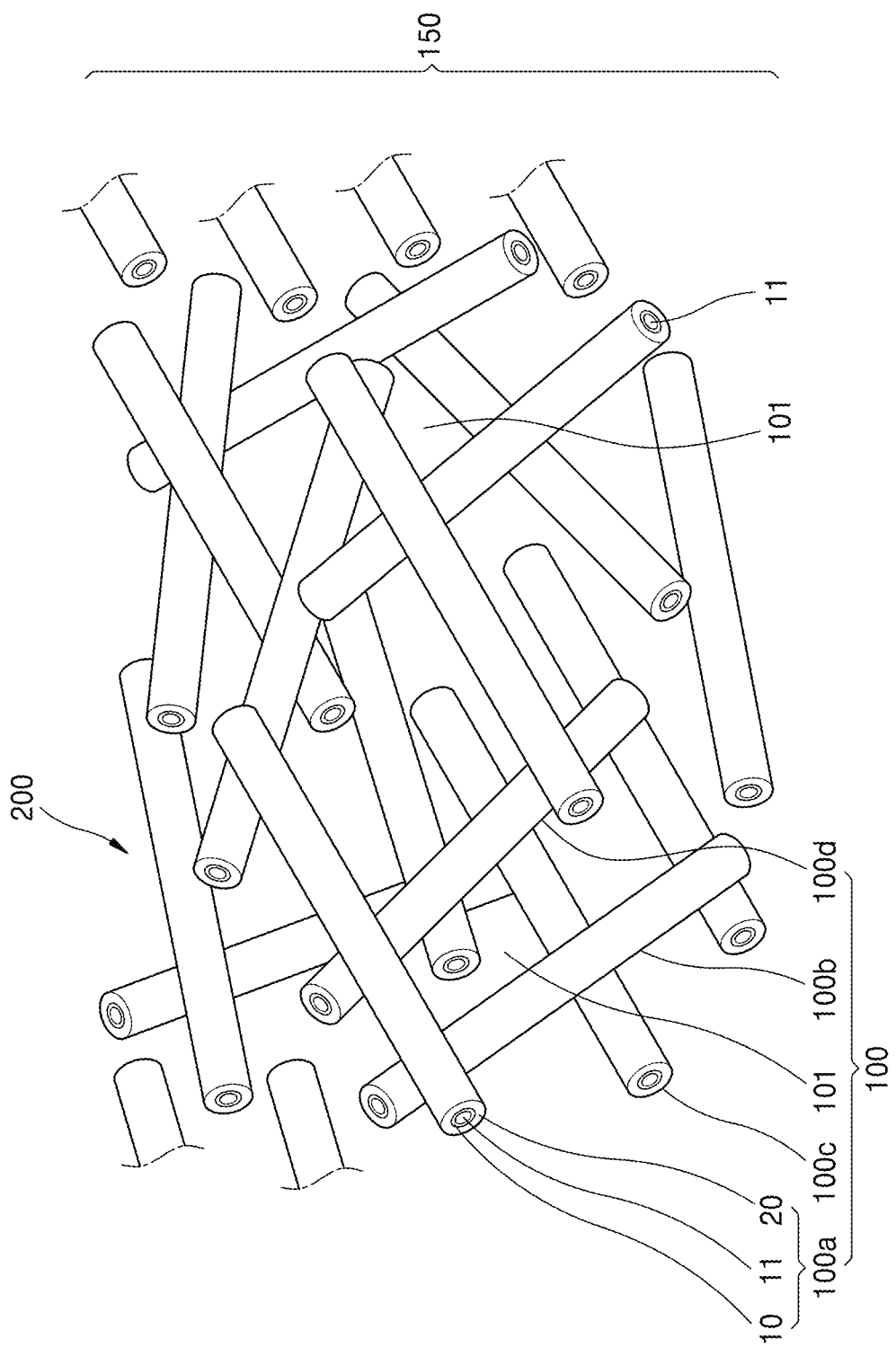
FIG. 2 is a schematic view of an electrode including a plurality of carbon composites, according to an embodiment.

Referring to FIG. 2, an electrode 200 according to an embodiment may include a porous layer 150 including a plurality of carbon composites 100. For example, since each of the carbon composites 100 includes a pore 11, the electrode 200 may include a porous layer 150.

The porous layer 150 may have a bimodal pore structure, e.g., a structure including two types of pores having different sizes. For example, in a pore distribution diagram of the porous layer 150 in the electrode 20, two peaks would be present corresponding to two types of pores in the porous layer, with each peak representing a pore having a different pore size. The pore distribution diagram may be obtained, for example, through a nitrogen adsorption test.

The porous layer 150 may include a first pore 11 in the carbonaceous core 10 and a second pore 101 between the plurality of carbon composites 100. The first pore 11 in the porous layer 150 may have a smaller diameter than a diameter of the second pore 101. For example, the first pore 11 may have a diameter of about 0.5 nm to about 2 nm, about 0.6 nm to about 1.9 nm, about 0.7 nm to about 1.8 nm, about 0.8 nm to about 1.7 nm, about 0.9 nm to about 1.6 nm, or about 1.0 nm to about 1.5 nm. For example, the second pore 101 may have a size of about 5 nm to about 90 urn, about 5 nm to about 50 urn, about 6 nm to about 20 urn, about 6 nm to about 10 urn, about 7 nm to about 5 um, about 7 nm to about 2 urn, about 8 nm to about 1 um, about 8 nm to about 500 nm, about 9 nm to about 200 nm, about 10 nm to about 200 nm, about 20 nm to about 190 nm, about 30 nm to about 180 nm, about 40 nm to about 170 nm, about 50 nm to about 160 nm, or about 60 nm to about 150 nm. For example, referring to FIGS. 3A and 3B, the second pore 101 may have a size of about 10 nm to about 200 nm.

In some embodiments, the first pore 11 in the carbonaceous core 10 of the porous layer 150 may have an aspect ratio of about 5 or greater, about 10 or greater, about 15 or greater, about 20 or greater, about 25 or greater, about 30 or greater, about 35 or greater, about 40 or greater, about 45 or greater, about 50 or greater, or about 100 or greater. For example, the first pore 11 in the carbonaceous core 10 may have an aspect ratio of about 1,000 or less, about 500 or less, or about 200 or less.

The first pore 11 in the porous layer 150 may have a regular shape, and the second pore 11 in the porous layer 150 may have an irregular shape. For example, the first pore 11 may have a regular one-dimensional rod-like shape, and the second pore 101 may have an irregular shape. The shape of the first pore 11 may be defined by a shape of the carbon composite 10 and the arrangement of the composites in the porous layer. For example, the shape of the second pore 101 may be defined by a first carbon composite 100a arranged in a first direction parallel to a length direction of the carbonaceous core 10, a second carbon composite 100b arranged in a second direction different from the first direction and in contact with the first carbon composite 100a, a third carbon composite 100c arranged in a third direction different from the second direction and in contact with the second carbon composite 100b, and a fourth carbon composite 100d arranged in a fourth direction different from the third direction and in contact with the first carbon composite 100a and the third carbon composite 100c.

The second pores 101 in the porous layer 150 may be arranged in a non-periodical and disordered manner. Accordingly, the porous layer 150 may have a pore structure different from that of a porous layer including a porous material having a periodical and ordered pore structure, for example, a material such as porous silica, or a material obtained using the porous material.

The porous layer 150 may have a porosity of about 10% to about 90%, about 15% to about 90%, about 15% to about 85%, about 20% to about 85%, about 20% to about 80%, about 25% to about 80%, about 25% to about 75%, about 30% to about 75%, about 35% to about 75%, about 40% to about 75%, about 50% to about 75%, or about 60% to about 75%. As used herein the term "porosity" is used to refer to a measure of the empty space (i.e., voids or pores) in a material and is determined as a percentage of the volume of voids in a material based on the total volume of the material.

The plurality of carbon composites 100 in the porous layer 150 may have a weight per unit area of about 0.1 milligram per square centimeter ($mg/cm^2$) to about 20 $mg/cm^2$, about 0.2 $mg/cm^2$ to about 15 $mg/cm^2$, about 0.3 $mg/cm^2$ to about 10 $mg/cm^2$, about 0.4 $mg/cm^2$ to about 9 $mg/cm^2$, about 0.5 $mg/cm^2$ to about 8 $mg/cm^2$, about 0.5 $mg/cm^2$ to 7 $mg/cm^2$, about 0.5 $mg/cm^2$ to about 6 $mg/cm^2$, about 0.5 $mg/cm^2$ to about 5 $mg/cm^2$, about 0.5 $mg/cm^2$ to about 4 $mg/cm^2$, about 0.5 $mg/cm^2$ to about 3 $mg/cm^2$, about 0.5 $mg/cm^2$ to about 2 $mg/cm^2$, or about 0.5 $mg/cm^2$ to about 1.5 $mg/cm^2$.

The carbonaceous core 10 in the porous layer 150 may have a weight per unit area of about 0.1 $mg/cm^2$ to about 10 $mg/cm^2$, about 0.1 $mg/cm^2$ to about 9 $mg/cm^2$, about 0.1 $mg/cm^2$ to about 8 $mg/cm^2$, about 0.2 $mg/cm^2$ to about 7 $mg/cm^2$, about 0.2 $mg/cm^2$ to about 6 $mg/cm^2$, about 0.2 $mg/cm^2$ to about 5 $mg/cm^2$, about 0.3 $mg/cm^2$ to about 4 $mg/cm^2$, about 0.3 $mg/cm^2$ to about 3 $mg/cm^2$, about 0.3 $mg/cm^2$ to about 2 $mg/cm^2$, about 0.4 $mg/cm^2$ to about 1.5 $mg/cm^2$, about 0.4 $mg/cm^2$ to about 1.3 $mg/cm^2$, about 0.4 $mg/cm^2$ to about 1.2 $mg/cm^2$, about 0.5 $mg/cm^2$ to about 1.0 $mg/cm^2$, or about 0.6 $mg/cm^2$ to about 1.0 $mg/cm^2$.

The porous electrolyte membrane 20 in the porous layer 150 may have a weight per unit area of about 0.01 $mg/cm^2$ to about 10 $mg/cm^2$, about 0.01 $mg/cm^2$ to about 5 $mg/cm^2$, about 0.01 $mg/cm^2$ to about 4 $mg/cm^2$, about 0.01 $mg/cm^2$ to about 3 $mg/cm^2$, about 0.01 $mg/cm^2$ to about 2 $mg/cm^2$, about 0.01 $mg/cm^2$ to about 1 $mg/cm^2$, about 0.03 $mg/cm^2$ to about 0.9 $mg/cm^2$, about 0.03 $mg/cm^2$ to about 0.8 $mg/cm^2$, about 0.05 $mg/cm^2$ to about 0.7 $mg/cm^2$, about 0.06 $mg/cm^2$ to about 0.6 $mg/cm^2$, about 0.08 $mg/cm^2$ to about 0.5 $mg/cm^2$, about 0.1 $mg/cm^2$ to about 0.4 $mg/cm^2$, about 0.15 $mg/cm^2$ to about 0.35 $mg/cm^2$, or about 0.2 $mg/cm^2$ to about 0.3 $mg/cm^2$.

The porous layer 150 may have a thickness of about 10 micrometers (μm) or greater. For example, the porous layer 150 may have a thickness of about 10 μm to about 500 μm, about 10 μm to about 400 μm, about 10 μm to about 300 μm, about 10 μm to about 200 μm, about 10 μm to about 100 μm, about 10 μm to about 90 μm, about 10 μm to about 80 μm, about 10 μm to about 70 μm, about 10 μm to about 60 μm, about 10 μm to about 50 μm, or about 10 μm to about 40 μm.

In the electrode 200 according to one or more embodiments, a content of the first ionic liquid (not shown) may be about 100 parts by weight to about 400 parts by weight, with respect to 100 parts by weight of the carbonaceous core 10. For example, the content of the first ionic liquid in the electrode 200 may be about 100 parts by weight to about 350 parts by weight, about 100 parts by weight to about 300 parts by weight, about 100 parts by weight to about 250 parts by weight, about 100 parts by weight to about 200 parts by weight, about 110 parts by weight to about 190 parts by weight, about 120 parts by weight to about 180 parts by weight, about 130 parts by weight to about 170 parts by weight, or about 140 parts by weight to about 160 parts by weight, with respect to 100 parts by weight of the carbonaceous core 10.

In some embodiments, the electrode 200 may further include a porous substrate (not shown) that supports the porous layer 150, the porous substrate having a regular structure and a greater mechanical strength than the porous layer 150. Due to the further inclusion of the porous substrate, the electrode 200 may have improved mechanical strength.

The electrode 200 may be cathode which uses oxygen as a cathode active material. This is distinguished from a lithium ion battery using a lithium transition metal oxide as a cathode active material.

According to another aspect of the present inventive concept, a lithium-air battery includes: a cathode; and a lithium-containing anode. The cathode is the electrode according to any of the above-described embodiments. Due to the inclusion of the cathode according to any of the above-described embodiments, the lithium-air battery may have improved cycle characteristics.

For example, a reaction mechanism of a lithium-air battery may be represented by Reaction Scheme 1.

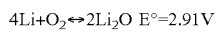
$4Li + O_2 \leftrightarrow 2Li_2O \quad E° = 2.91V$

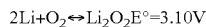
$2Li + O_2 \leftrightarrow Li_2O_2 \quad E° = 3.10V$      Reaction Scheme 1

During discharge, lithium originating from the anode of the lithium-air battery reacts with oxygen introduced from the cathode to generate a lithium oxide ($Li_2O_2$), while the oxygen is reduced (oxygen reduction reaction: ORR). On the other hand, during charging, the lithium oxide is reduced to evolve oxygen therefrom (oxygen evolution reaction: OER). During discharging, $Li_2O_2$ is deposited within pores of the cathode. The larger the contact area between the oxygen and the electrolyte, the higher the capacity of the lithium-air battery.

The lithium-air battery according to one or more embodiments may be manufactured as described hereinafter.

First, a cathode including the carbon composite according to any of the embodiments may be prepared as follows. The cathode may be an air electrode. A current collector may be disposed on the cathode.

The carbon composite, a binder, and an electrolyte are mixed together, and an appropriate solvent may be added thereto to prepare a cathode slurry. In some embodiments, the solvent may be omitted. Then, the cathode slurry may be coated on a surface of a current collector and dried, optionally followed by press-molding the cathode slurry against the current collector to improve the density of the cathode. The current collector may be a gas diffusion layer. The electrolyte may include a lithium salt and an ionic liquid. In some embodiments, the cathode slurry may be coated on a surface of a separator or solid electrolyte membrane and dried, optionally followed by press-molding against the separator or solid electrolyte membrane to improve the density of the cathode.

Optionally, the cathode slurry may include. The binder may include a thermoplastic resin or a thermocurable resin. For example, the binder may be polyethylene, polypropylene, polytetrafluorethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, or a combination thereof. However, embodiments are not limited thereto. Any suitable binder may be used.

A porous structure in a matrix or mesh form may be used as the current collector to facilitate diffusion of oxygen. A porous metal plate made of, for example, stainless steel (SUS), nickel, or aluminum may also be used as the current collector. Materials for the current collector are not particularly limited, and any appropriate materials for use as a current collector may be used. The current collector may be coated with an anti-oxidation metal or alloy film to prevent oxidation.

Optionally, the cathode slurry may include a catalyst for oxidation/reduction of oxygen. Non-limiting examples of the catalyst may include a precious metal catalyst, such as platinum (Pt), gold (Au), silver (Ag), palladium (Pd), ruthenium (Ru), rhodium (Rh), and osmium (Os); an oxide catalyst, such as manganese oxide, iron oxide, cobalt oxide, and nickel oxide; or an organic metal catalyst, such as cobalt phthalocyanine. Any appropriate catalysts for oxidation/reduction of oxygen may be used.

The catalyst may be supported on a support. Non-limiting examples of the support may include oxide, zeolite, clay mineral, and carbon. The oxide may include an oxide of alumina, silica, zirconium oxide, titanium dioxide, or a combination thereof. The oxide may be an oxide that includes a metal including cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Non-limiting examples of the carbon support may include a carbon black, such as Ketjen black, acetylene black, channel black, and lamp black; a graphite, such as natural graphite, artificial graphite, and expanded graphite; an activated carbon; and a carbon fiber. A combination comprising at least one of the foregoing may also be used. Any appropriate materials for the support may be used.

The cathode slurry may further include a conducting agent. Optionally, the cathode slurry may include a lithium oxide. Any materials that are porous and have conductivity may be used as the conducting material without limitations. For example, the conducting material may be a porous carbonaceous material. Examples of such porous carbonaceous materials may include carbon black, graphite, graphene, activated carbon, carbon fiber, or a combination thereof. For example, a metallic conducting material such as metal fiber, metal mesh, or the like, or a metallic powder such as copper, silver, nickel, or aluminum in a powder form may be used. An organic conducting material such as a polyphenylene derivative may also be used. These conducting materials may be used alone or in combination.

Next, an anode including lithium may be prepared.

The anode may be a lithium metal thin film or a lithium metal alloy thin film. For example, the lithium metal alloy may be an alloy of lithium with, for example, aluminum, tin, magnesium, indium, calcium, titanium, vanadium, or a combination thereof.

Next, an electrolyte membrane may be disposed between the cathode and the anode.

The electrolyte membrane may include a liquid electrolyte, a gel electrolyte, a solid electrolyte, or a combination thereof, disposed between the cathode and the anode. The liquid electrolyte, the gel electrolyte, and the solid electrolyte are not particularly limited, and may be any electrolyte suitable for use in a lithium battery.

For example, the liquid electrolyte may include a solvent and a lithium salt. The solvent may include an organic solvent, an ionic liquid, an oligomer, or a combination thereof. However, embodiments are not limited thereto. Any solvents that are in liquid form at room temperature (25° C.) may be used.

The organic solvent may include an ether solvent, a carbonate solvent, an ester solvent, a ketone solvent, or a combination thereof. For example, the organic solvent may include propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane, 2-methyltetrahydrofuran, tetrahydrofuran, or a combination thereof. However, embodiments are not limited thereto. The organic solvent may be any organic solvent that is in liquid form at room temperature. The ionic liquid may include one or more of the above-listed examples of ionic liquids as the first ionic liquid and/or the second ionic liquid of the carbon composite according to any of the above-described embodiments.

The lithium salt of the liquid electrolyte may include LiTFSI, LiPF$_6$, LiBF$_4$, LiAsF$_6$, LiClO$_4$, LiNO$_3$, (lithium bis(oxalato) borate (LiBOB), LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, LiAlCl$_4$, lithium trifluoromethanesulfonate (LiTfO), or a combination thereof. However, embodiments are not limited thereto. Any materials suitable for use as a lithium salt may be used. A concentration of the lithium salt may be about 0.01 molar (M) to about 2.0 M. However, embodiments are not limited thereto. The concentration of the lithium salt may be appropriately adjusted by the person of skill in the art without undue experimentation.

The solid electrolyte of the electrolyte membrane may include an ionically conducting polymer, a polymeric ionic liquid (PIL), an inorganic electrolyte, a polymer matrix, an electronically conducting polymer, or a combination thereof, but is not limited thereto. Any material suitable for use as a solid electrolyte may be used. The polymer matrix may not have ionic conductivity or electronic conductivity.

The solid electrolyte may include polyethylene oxide (PEO), a solid graft copolymer including at least two polymer blocks having low glass transition temperatures (Tg), poly(diallyldimethylammonium) trifluoromethanesulfonyl imide (poly(diallyldimethylammonium)TFSI), Cu$_3$N, Li$_3$N, LiPON, Li$_3$PO$_4$.Li$_2$S.SiS$_2$, Li$_2$S.GeS$_2$.Ga$_2$S$_3$, Li$_2$O.11Al$_2$O$_3$, Na$_2$O.11Al$_2$O$_3$, (Na,Li)$_{1+x}$Ti$_{2-x}$Al$_x$(PO$_4$)$_3$ (wherein (0.1≤x≤0.9), Li$_{1+x}$Hf$_{2-x}$Al$_x$(PO$_4$)$_3$ (wherein 0.1≤x≤0.9), Na$_3$Zr$_2$Si$_2$PO$_{12}$, Li$_3$Zr$_2$Si$_2$PO$_{12}$, Na$_5$ZrP$_3$O$_{12}$, Na$_5$TiP$_3$O$_{12}$, Na$_3$Fe$_2$P$_3$O$_{12}$, Na$_4$NbP$_3$O$_{12}$, Na-Silicates, Li$_{0.3}$La$_{0.5}$TiO$_3$, Na$_5$MSi$_4$O$_{12}$ (wherein M is a rare earth element, for example, Nd, Gd, Dy, or a combination thereof), Li$_5$ZrP$_3$O$_{12}$, Li$_5$TiP$_3$O$_{12}$, Li$_3$Fe$_2$P$_3$O$_{12}$, Li$_4$NbP$_3$O$_{12}$, Li$_{1+x}$(M,Al,Ga)$_x$(Ge$_{1-y}$Ti$_y$)$_{2-x}$(PO$_4$)$_3$ (wherein x≤0.8, 0≤y≤1.0, and M may be Nd, Sm, Eu, Gd, Tb, Dy, Ho, Er, Tm, Yb, or a combination thereof), Li$_{1+x+y}$Q$_x$Ti$_{2-x}$Si$_y$P$_{3-y}$O$_{12}$ (wherein 0≤x≤0.4, 0<y≤0.6, and Q may be Al, Ga, or a combination thereof), Li$_6$BaLa$_2$Ta$_2$O$_{12}$, Li$_7$La$_3$Zr$_2$O$_{12}$, Li$_5$La$_3$Nb$_2$O$_{12}$, Li$_5$La$_3$M$_2$O$_{12}$ (wherein M may be Nb, Ta, or a combination thereof), and Li$_{7+x}$A$_x$La$_{3-x}$Zr$_2$O$_{12}$ (wherein 0<x<3 and A may be Zn).

The solid electrolyte may include, as an ion conductive polymer, an ion conductive repeating unit selected from an ether monomer, an acryl monomer, a siloxane monomer, or a combination thereof.

The ion conductive polymer may include polyethylene oxide, polypropylene oxide, polymethyl methacrylate, polyethyl methacrylate, polydimethylsiloxane, polymethyl acrylate, polyethyl acrylate, poly(2-ethylhexyl acrylate), polybutyl methacrylate, poly(2-ethylhexyl methacrylate), polydecyl acrylate, polyethylene vinyl acetate, or a combination thereof. The ion conductive polymer may be a copolymer including an ion conductive repeating unit and a structural repeating unit. The ion conductive repeating unit may be derived from a one monomer including acrylic acid, methacrylic acid, methyl acrylate, methyl methacrylate, ethyl acrylate, ethyl methacrylate, 2-ethylhexyl acrylate, butyl methacrylate, 2-ethylhexyl methacrylate, decyl acrylate, ethylene vinyl acetate, ethylene oxide, propylene oxide, or a combination thereof. For example, the structural repeating unit may be derived from styrene, 4-bromostyrene, tert-butylstyrene, divinylbenzene, methyl methacrylate, isobutyl methacrylate, butadiene, ethylene, propylene, dimethyl siloxane, isobutylene, N-isopropyl acrylamide, vinyl fluoride, acrylonitrile, 4-methyl pentene-1, butylene terephthalate, ethylene terephthalate, vinyl pyridine, or a combination thereof. The ion conductive polymer may be a block copolymer including an ion conductive phase and a structural phase. Examples of the block copolymer including an ion conductive phase and a structural phase may include block copolymers disclosed in U.S. Pat. Nos. 8,269,197 and 8,563,168, and in U.S. patent publication number 2011/0206994, each of which is disclosed herein by reference in their entirety.

The gel electrolyte may be obtained by adding a low-molecular weight solvent to a solid electrolyte disposed between the cathode and the anode. For example, the gel electrolyte may be a gel electrolyte including a polymer as a major ingredient, and may be obtained by adding, for example, a low-molecular weight solvent to a solid electrolyte including the common polymer.

The separator may be disposed between the cathode and the anode. The separator may be any separator having a composition suitable for use in a lithium-air battery. For example, the separator may be a polymeric non-woven fabric such as polypropylene non-woven fabric or polyphenylene sulfide non-woven fabric; a porous film of an olefin resin such as polyethylene or polypropylene; glass fiber; or a combination comprising at least one of the foregoing materials. The separator may be impregnated with a liquid electrolyte as described above.

An oxygen blocking layer that is impervious to oxygen may be disposed between the cathode and the anode. The oxygen blocking layer, which may be a lithium ion conductive solid electrolyte membrane, may serve as a protective layer preventing direct reaction between the lithium metal anode and impurities such as oxygen present in an electrolyte of the cathode. An example of a material for the lithium ion conductive solid electrolyte membrane that is impervious to oxygen may include an inorganic material-containing lithium ion conductive glass, lithium ion conductive crystals (ceramic or glass-ceramic), or a combination thereof. However, embodiments are not limited thereto. Any solid electrolyte membrane having lithium ion conductivity and being impervious to oxygen to protect the anode may be used. For example, the lithium ion conductive solid electrolyte membrane may include an oxide in consideration of chemical stability.

When the lithium ion conductive solid electrolyte membrane includes a large amount of lithium ion conductive crystals, the lithium ion conductive solid electrolyte membrane may have excellent ion conductivity. Accordingly, the amount of the lithium ion conductive crystals may be, for example, about 50 wt % or more, about 55 wt % or more, or about 60 wt % or more, based on a total weight of the lithium ion conductive solid electrolyte membrane. Non-limiting examples of lithium ion conductive crystals may include crystals having a perovskite structure and lithium ion conductivity, such as $Li_3N$, lithium superionic conductor (LISICON), or $La_{0.55}Li_{0.35}TiO_3$; $LiTi_2P_3O_{12}$ having a sodium superionic conductor (NASICON) type structure; or a glass-ceramic able to precipitate these crystals. The lithium ion conductive crystals may be $Li_{1+x+y}(Al, Ga)_x(Ti, Ge)_{2-x}Si_yP_{3-y}O_{12}$ (wherein $0 \leq x \leq 1$ and $0 \leq y \leq 1$, for example, $0 \leq x \leq 0.4$ and $0 < y \leq 0.6$, or $0.1 \leq x \leq 0.3$ and $0.1 < y \leq 0.4$). To increase the ion conductivity of lithium ion conductive crystals, the lithium ion conductive crystals must have no grain boundary that may interrupt ion conduction. For example, a glass-ceramic has nearly no pore or grain boundary capable of interrupting ion conduction, and thus may have high ion conductivity and good chemical stability. Non-limiting examples of glass-ceramic materials for the lithium ion conductive crystals include lithium-aluminum-germanium-phosphate (LAGP), lithium-aluminum-titanium-phosphate (LATP), lithium-aluminum-titanium-silicon-phosphate (LATSP), or a combination thereof. For example, when a parent glass having $Li_2O$—$Al_2O_3$—$TiO_2$—$SiO_2$—$P_2O_5$ composition is crystallized by thermal treatment, the resulting main crystal phase may be $Li_{1+x+y}Al_xTi_{2-x}Si_yP_{3-y}O_{12}$ (wherein $0 \leq x \leq 1$ and $0 \leq y \leq 1$). For example, in the formula $Li_{1+x+y}Al_xTi_{2-x}Si_yP_{3-y}O_{12}$, x and y may satisfy, for example, $0 \leq x \leq 0.4$ and $0 < y \leq 0.6$, or $0.1 \leq x \leq 0.3$ and $0.1 < y \leq 0.4$. The holes or grain boundaries which interrupt ion conduction refer to an ion conduction-interrupting material such as holes or boundaries that reduce the total conductivity of an inorganic material including lithium ion conductive crystals to one-tenth (1/10) or less of the conductivity of the lithium ion conductive crystals alone in the inorganic material. For example, the oxygen blocking layer may include $Li_{1+x+y}Al_xTi_{2-x}Si_yP_{3-y}O_{12}$ (wherein $0 \leq x \leq 1$ and $0 \leq y \leq 1$). In some embodiments, in the formula $Li_{1+x+y}Al_xTi_{2-x}Si_yP_{3-y}O_{12}$, x and y may satisfy $0 \leq x \leq 0.4$ and $0 \leq y \leq 0.6$, or for example, $0.1 \leq x \leq 0.3$ and $0.1 < y \leq 0.4$. In some embodiments, the oxygen blocking layer may include $Li_{1+x+y}Al_x(Ti,Ge)_{2-x}Si_yP_{3-y}O_1$ (wherein $0 \leq x \leq 2$ and $0 \leq y \leq 3$). For example, the oxygen blocking layer may be a solid electrolyte membrane including LATP ($Li_{1.4}Ti_{1.6}Al_{0.4}P_3O_{12}$).

The lithium-air battery according to one or more embodiments may further include an anode interlayer between the anode and the oxygen blocking layer. The anode interlayer may prevent a side reaction that may take place between the anode and the oxygen blocking layer. The anode interlayer may include a solid polymer electrolyte. For example, the solid polymer electrolyte may be polyethylene oxide (PEO) doped with a lithium salt, wherein non-limiting examples of the lithium salt may include $LiN(SO_2C_2F_5)_2$, $LiC(SO_2CF_3)_3$, $LiN(SO_3CF_3)_2$, $LiC_4F_9SO_3$, $LiAlCl_4$, or a combination thereof.

For example, the electrolyte membrane may have a structure including a separator impregnated with a solid polymer electrolyte. The electrolyte membrane including a separator impregnated with a solid polymer electrolyte may be prepared by arranging a solid polymer electrolyte film or films on one or both surfaces of the separator and then performing roll-pressing thereon at the same time. In some embodiments, the electrolyte membrane may be prepared by injecting a liquid electrolyte including a lithium salt into the separator.

Next, after installing the anode on an inner side of a case, the electrolyte membrane may be mounted on the anode, and then the cathode having a lithium ion conductive solid electrolyte membrane (i.e., oxygen blocking layer) thereon may be mounted on the electrolyte membrane. Next, after a porous current collector is disposed on the cathode, the resulting cell structure is fixed by pressing with a pressing member such that the air may be delivered to the air electrode (i.e., cathode), thereby completing the manufacture of a lithium-air battery.

The case may be divided into an upper portion that contacts the anode, and a lower portion that contacts the air electrode. An insulting resin may be disposed between the upper and lower portions to electrically insulate the air electrode and the anode from one another.

The lithium-air battery according to any of the above-described embodiments may be used as a lithium primary battery or a lithium secondary battery. The lithium-air battery may have any of a variety of different shapes, and is not limited to a specific shape. For example, the lithium-air battery may have a shape like a coin, a button, a sheet, a stack, a cylinder, a plane, or a horn. The lithium-air battery may be used as a large battery for electric vehicles.

Figure 5:
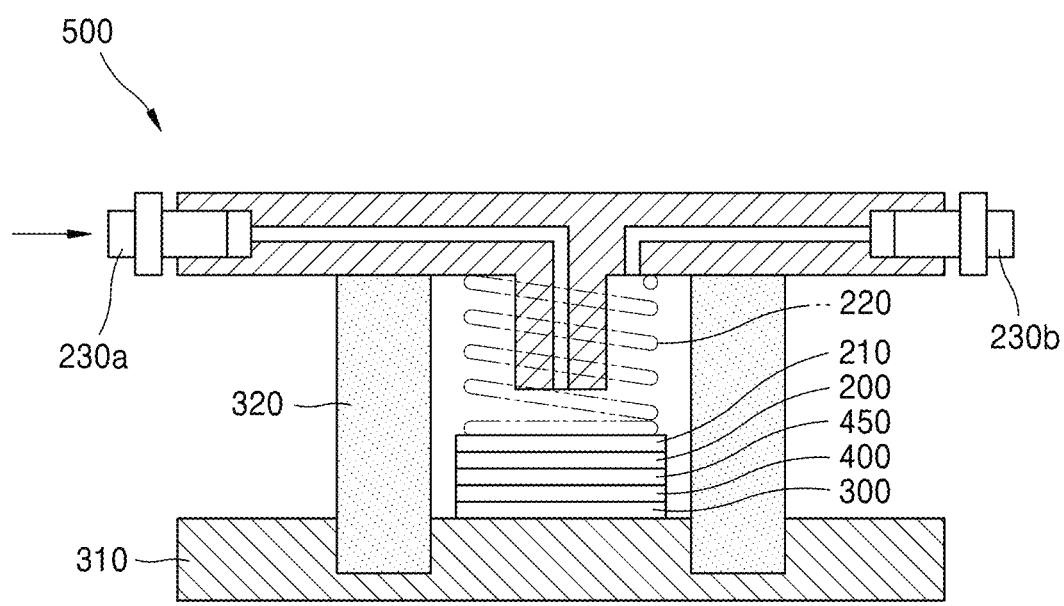
FIG. 5 is a schematic view of a structure of a lithium-air battery, according to an embodiment.

A lithium-air battery according to an embodiment is schematically illustrated in FIG. 5. Referring to FIG. 5, a lithium-air battery 500 according to an embodiment may include a cathode 200 adjacent to a first current collector 210 and using oxygen as an active material, an anode 300 adjacent to a second current collector 310 and including lithium, and an electrolyte membrane 400 disposed between the cathode 200 and the anode 300. A lithium ion conductive solid electrolyte membrane 450 may be disposed between the cathode 200 and the electrolyte membrane 400. The first current collector 210, which may be porous, may serve as a gas diffusion layer that allows diffusion of oxygen. A pressing member 210 that may transport air to the cathode 200 may be arranged on the first current collector 210. A case 320 made of an insulating resin may be disposed between the cathode 200 and the anode 300 to electrically separate the cathode 200 and the anode 300. The air may be supplied into the lithium-air battery 500 through an air inlet 213a and may be discharged through an air outlet 230b. The lithium-air battery 500 may be accommodated in a stainless steel (SUS) container.

The term "air" used herein is not limited to atmospheric air, and for convenience, may refer to a combination of gases including oxygen, or a pure oxygen gas. This broad definition of "air" also applies to other terms, including "air battery" and "air electrode."

According to another aspect of the present inventive concept, a method of preparing the carbon composite according to any of the above-described embodiments includes: coating a second ionic liquid on a carbonaceous core to prepare a coated carbonaceous core; disposing a first polymer layer on the carbonaceous core to provide a first polymer layer coated carbonaceous core, wherein the first polymer layer has a first ionic charge opposite to a third ionic charge of the second ionic liquid; disposing a second polymer layer on the first polymer layer coated carbonaceous core to provide a second polymer layer coated carbonaceous core, wherein the second polymer layer has a second ionic charge opposite to the first ionic charge of the first polymer layer; and impregnating the first and second polymer layers with a first ionic liquid.

Since a plurality of polymer layers are arranged on the carbonaceous core in a layer-by-layer assembly (LBL) manner by electrostatic attraction (electrostatic bond), the polymer electrolyte membrane of the carbon composite, including the plurality of polymer layers, may have excellent mechanical strength and improved ion conductivity due to the inclusion of the first ionic liquid.

The coating of the second ionic liquid on the carbonaceous core may include dispersing the carbonaceous core in the second ionic liquid to prepare a first dispersion, filtering the first dispersion to prepare a first filtered product, and drying the first filtered product. The second ionic liquid may include one or more of the ionic liquids listed above in connection with the embodiments of the carbon composite.

The disposing of the first polymer layer on the coated carbonaceous core, the first polymer layer ionically charged to have a charge opposite to a charge of the second ionic liquid, may include dispersing the coated carbonaceous core in a solution including a first polymer ionically charged to have an ionic charge opposite to the ionic charge of the second ionic liquid to prepare a second dispersion, filtering the second dispersion to prepare a second filtered product, and drying the second filtered product to prepare a first polymer layer coated carbonaceous core. The disposing of the second polymer layer on the first polymer layer, the second polymer layer ionically charged to have a charge opposite to the charge of the first polymer layer, may include dispersing the first polymer layer coated carbonaceous core in a solution including a second polymer ionically charged to have a charge opposite to the first polymer to prepare a third dispersion, filtering the third dispersion to prepare a third filtered product, and drying the third filtered product to provide the second polymer layer coated carbonaceous core.

The impregnating of the first and second polymer layers with the first ionic liquid may include mixing the second polymer layer coated carbonaceous core coated with the first ionic liquid, and performing a thermal treatment at a temperature of about 100° C. to about 140° C. for about 1 hour to about 10 hours. Since the first polymer layer and the second polymer layer in the polymer electrolyte membrane are strongly bound together by electrostatic bond and are in a solid state at room temperature, it is not easy to impregnate the first ionic liquid into the polymer electrolyte membrane. Accordingly, the first ionic liquid may be impregnated into the polymer electrolyte membrane by first softening the polymer electrolyte membrane at a high temperature. In some other embodiments, after forming a porous electrode by mixing the carbon composite according to any of the embodiments, a binder, a lithium salt, and a first ionic liquid, the above-described thermal treatment may be performed to impregnate the first ionic liquid into the polymer electrolyte membrane of the carbon composite.

The method of preparing the carbon composite may further include coating a plurality of additional polymer layers on the second polymer layer before impregnating the polymer layers with the first ionic liquid. For example, the method of preparing the carbon composite may further include: disposing a third polymer layer on the second polymer layer, the third polymer layer having an ionic charge which is the same as the ionic charge of the first polymer layer; and disposing a fourth polymer layer on the third polymer layer, the fourth polymer layer having an ionic charge which is opposite to the ionic charge of the first polymer layer. The number of coated polymer layers may be adjusted according to desired physical properties of the carbon composite.

Substituents in the formulae above are defined as follows.

As used herein, the term "alkyl group" indicates a completely saturated, branched or unbranched (or a straight or linear) hydrocarbon group.

Non-limiting examples of the alkyl group may include a methyl group, an ethyl group, a n-propyl group, an isopropyl group, a n-butyl group, an isobutyl group, a sec-butyl group, a t-butyl group, an isopentyl group, a neopentyl group, an iso-amyl group, a n-hexyl group, a 3-methylhexyl group, a 2,2-dimethylpentyl group, a 2,3-dimethylpentyl group, and a n-heptyl group.

At least one hydrogen atom of the alkyl group may be substituted with a halogen atom, a $C_1$-$C_{20}$ alkyl group substituted with a halogen atom (for example, $CF_3$, $CHF_2$, $CH_2F$, $CCl_3$, and the like), a $C_1$-$C_{20}$ alkoxy group, a $C_2$-$C_{20}$ alkoxyalkyl group, a hydroxyl group, a nitro group, a cyano group, an amino group, an alkyl amino group, an amidano group, a hydrazine, a hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

As used herein, the term "cycloalkyl" means a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups. Cycloalkyl groups do not include an aromatic ring or a heterocyclic ring. When the numbers of carbon atoms is specified (e.g., C3 to C15 cycloalkyl), the number means the number of ring members present in the one or more rings.

As used herein, the term "heterocycloalkyl group" indicates a cycloalkyl group including at least one heteroatom selected from selected from nitrogen (N), oxygen (O), phosphorous (P), and sulfur (S). The cycloalkyl group in the heterocycloalkyl group may be the same as described above.

As used herein, the term "halogen atom" indicates fluorine, bromine, chloride, iodine, and the like.

As used herein, the term "alkoxy group" indicates "alkyl-O—", wherein the alkyl group may be the same as described above. Non-limiting examples of the alkoxy group may include a methoxy group, an ethoxy group, a propoxy group, a 2-propoxy group, a butoxy group, a t-butoxy group, a pentyloxy group, a hexyloxy group, a cyclopropoxy group, and a cyclohexyloxy group. At least one hydrogen atom in the alkoxy group may be substituted with one of the substituents as described above in conjunction with the above-described alkyl group.

As used herein, the term "aryl" group, which is used alone or in combination, refers to an aromatic hydrocarbon containing at least one ring.

The term "aryl" means a monovalent group formed by the removal of one hydrogen atom from one or more rings of an arene.

Non-limiting examples of the aryl group may include a phenyl group, a naphthyl group, and a tetrahydronaphthyl group.

At least one hydrogen atom in the aryl group may be substituted with one of the substituents as described above in connection with the alkyl group.

As used herein, the term "alkoxy" means an alkyl group that is linked via an oxygen (i.e., alkyl-O—), for example methoxy, ethoxy, and sec-butyloxy groups.

As used herein, the term "aryloxy group" indicates "aryl-O—", wherein the aryl group that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

As used herein, the term "heteroaryl" means a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, Spiro or fused. The heteroatom(s) are generally independently nitrogen (N), oxygen (O), P (phosphorus), or sulfur (S).

In the heteroaryl group, S or N may be present in various oxidized forms.

Non-limiting examples of the monocyclic heteroaryl group include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, or a 5-pyrimidin-2-yl group.

The term "heteroaryl" group includes a heteroaromatic ring fused to at least one of an aryl group, a cycloaliphatic group, or a heterocyclic group.

Non-limiting examples of the bicyclic heteroaryl group include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with one of the substituents as described above in conjunction with the alkyl group.

As used herein, the term "heteroaryloxy group" indicates "heteroaryl-O—", wherein the heteroaryl group may be the same as described above. As used herein, the terms "alkylene", "arylene", "heteroarylene", "cycloalkylene", and "heterocycloalkylene" indicate, respectively, the alkyl, aryl, heteroaryl, cycloalkyl, and heterocycloalkyl of which one hydrogen atom is substituted with a radical.

The term "alkylene oxide" refers to a compound having the formula

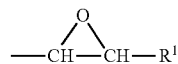

wherein $R_1$ is hydrogen or a $C_1$-$C_{12}$ alkyl group.

"Acryl" includes acrylic, methacrylic, (C1 to C20 alkyl)acrylate, and (C1 to C20 alkyl)methacrylate. Herein, the term "acryl monomer" refers to a (meth)acrylic monomer or a (meth)acrylate monomer. "(Meth)acrylic" includes acrylic and methacrylic, and "(meth)acrylate" includes acrylate and methacrylate, for example a (C1 to C12 alkyl) acrylate or (C1 to C12 alkyl) methacrylate.

One or more embodiments of the present disclosure will now be described in detail with reference to the following examples. However, these examples are only for illustrative purposes and are not intended to limit the scope of the one or more embodiments of the present disclosure.

EXAMPLES (Preparation of Carbon Composite Coated with Polymer Layer)

Preparation Example 1: Formation of Single Polymer Bilayer

About 50 milligrams (mg) of multi-walled carbon nanotubes (MWCNTs) and about 1 gram (g) of 1-ethyl-3-methylamidazolium bis(trifluoromethylsulfonyl)imide (EMI-TFSI) were added to about 100 milliliters (mL) of acetonitrile and then dispersed using a sonicator.

A product resulting from the dispersing was filtered to obtain MWCNTs of which surfaces were coated with EMI-TFSI and charged with positive charges.

The surface-treated MWCNTs were dispersed in a polymer solution including a lithiated NAFION® (Li-NAFION®), filtered, and then washed to form a first polymer layer including the Li-NAFION® on the MWCNTs. A ratio by weight of the Li-NAFION® polymer to the surface-treated MWCNTs in the polymer solution was about 1:10.

Subsequently, the MWCNTs having the first polymer layer were dispersed in a polymer solution including poly(diallyldimethylammonium chloride) (PDDA), filtered, and then washed to form a second polymer layer including PDDA on the first polymer layer of the MWCNTs. A ratio by weight of the PDDA polymer to the MWCNTs having the first polymer layer in the polymer solution was about 1:10.

By forming one polymer bilayer including the first and second polymer layers one time on the surface of the MWCNTs through the above-described processes, a carbon composite coated with the first and second polymer layers was prepared. Transmission electron microscope (TEM) images of the prepared carbon composite are shown in FIGS. 3A and 3B.

Figure 3A:
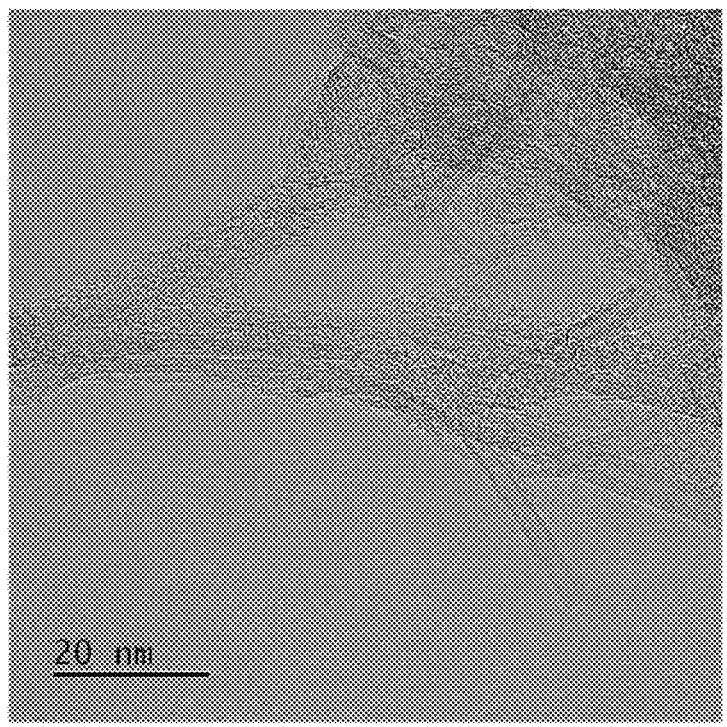
FIG. 3A is a transmission electron microscope (TEM) image of a carbon composite prepared in accordance with Preparation Example 1.
Figure 3B:
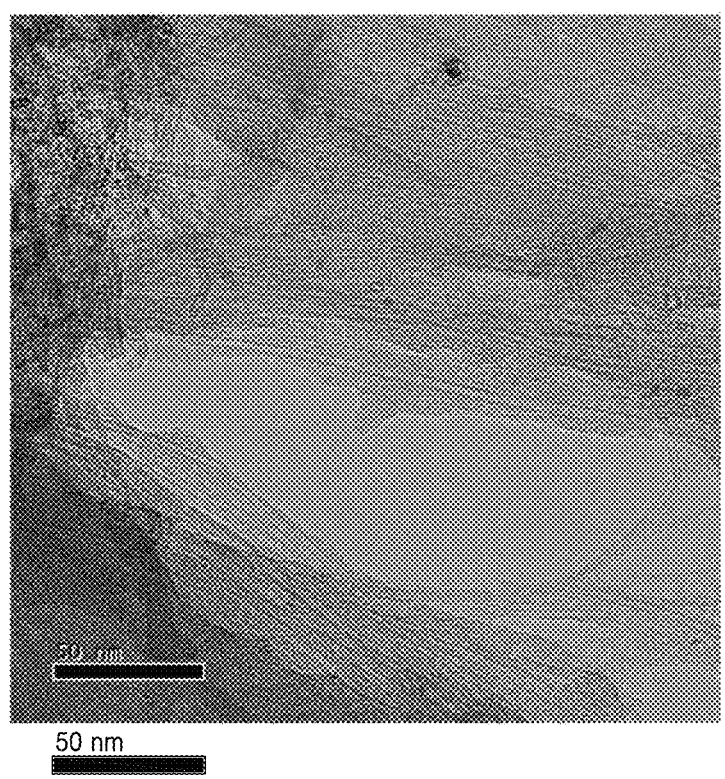
FIG. 3B is a magnified TEM image of the carbon composite of Preparation Example 1.

Referring to FIGS. 3A and 3B, the MWCNTs were found to include a first pore having an aspect ratio of about 10 to about 100 and a diameter of about 1.5 nm. A polymer electrolyte membrane consisting of the one polymer bilayer coated on the MWCNTs had a thickness of about 2 nm to about 5 nm.

Preparation Example 2: Formation of Two Polymer Bilayers

A carbon composite was prepared in the same manner as in Preparation Example 1, except that two polymer bilayers were formed by repeating the above-described processes twice.

Preparation Example 3: Formation of Three Polymer Bilayers

A carbon composite was prepared in the same manner as in Preparation Example 1, except that three polymer bilayers were formed by repeating the above-described processes three times.

Preparation Example 4: Formation of Four Polymer Bilayers

A carbon composite was prepared in the same manner as in Preparation Example 1, except that four polymer bilayers were formed by repeating the above-described processes four times.

Comparative Preparation Example 1: Preparation of Carbon Composite without Polymer Bilayer About 50 mg of MWCNTs and about 1 g of EMI-TFSI were added to about 100 mL of acetonitrile and then dispersed using a sonicator.

A product resulting from the dispersing was filtered to obtain MWCNTs of which surfaces were coated with EMI-TFSI and charged with positive charges.

The surface-treated MWCNTs were used as a carbon composite as they were.

(Manufacture of Cathode)

Example 1

The carbon composite in powder form prepared in Preparation Example 1, polytetrafluoroethylene (PTFE) as a binder, and a solution of 0.5M LiTFSI (lithium bis(trifluoromethylsulfonyl)imide) as a lithium salt in EMI-TFSI were mixed in a weight ratio of about 100:20:150 to obtain a mixture. This mixture was used to form a porous electrode having a thickness of about 10 µm to about 40 µm by roll-pressing. A concentration of the LiTFSI with respect to the ionic liquid (i.e., EMI-TFSI) was about 0.5 M. The electrode was thermally treated in an oven at a temperature of about 100° C. to about 140° C. for about 2 hours to impregnate the ionic liquid into the polymer bilayer of the carbon composite, thereby obtaining a porous cathode including the carbon composites impregnated with the ionic liquid.

Referring to FIGS. 3A and 3B, a plurality of carbon composites with second pores therebetween and the MWCNTs having a first pore are shown. Accordingly, the porous cathode was found to have a bimodal pore structure including two types of pores having different sizes.

In FIGS. 3A and 3B, the second pores had a size of about 10 nm to about 50 nm. The size of the second pores means an average of the smallest and largest diameters of the second pores in FIGS. 3A and 3B.

The porous layer had a porosity of about 70%. In the porous electrode, the carbonaceous core (i.e., MWCNTs) had a weight per unit area of about 0.8 mg/cm$^2$, the polymer bilayer impregnated with the ionic liquid had a weight per unit area of about 0.2 mg/cm$^2$, and the carbon composites had a weight per unit area of about 1.0 mg/cm$^2$.

Example 2

Carbon composites including the ionic liquid and a porous cathode including the carbon composites were prepared in the same manner as in Example 1, except that the carbon composite in powder form prepared in Preparation Example 2 was used.

Example 3

Carbon composites including the ionic liquid and a porous cathode including the carbon composites were prepared in the same manner as in Example 1, except that the carbon composite in powder form prepared in Preparation Example 3 was used.

Example 4

Carbon composites including the ionic liquid and a porous cathode including the carbon composites were prepared in the same manner as in Example 1, except that the carbon composite in powder form prepared in Preparation Example 4 was used.

Comparative Example 1

Carbon composites including the ionic liquid and a porous cathode including the carbon composites were prepared in the same manner as in Example 1, except that the carbon composite in powder form prepared in Comparative Preparation Example 1 was used.

(Manufacture of Cathode-Electrolyte Assembly)

Example 5

A cathode-electrolyte assembly for use in manufacturing a lithium-air battery was manufactured by disposing the porous cathode (having a weight per unit area of about 1.0 mg/cm$^2$ and an area of about 1 cm×1 cm) manufactured in Example 1 on a lithium-aluminum titanium phosphate (LATP) solid electrolyte membrane (having a thickness of about 250 µm, available from Ohara Corp., Japan).

Examples 6 to 8

Cathode-electrolyte assemblies were manufactured in the same manner as in Example 5, except that the porous electrodes of Examples 2 to 4 were used, respectively.

Comparative Example 2

A cathode-electrolyte assembly was manufactured in the same manner as in Example 5, except that the porous electrode of Comparative Example 1 was used.

(Manufacture of Lithium-Air Battery)

Example 9

A separator (CELGARD® 3501) was arranged on a lithium metal thin film anode. About 0.2 mL of an electrolyte solution of 0.5M LiTFSI (lithium bis(trifluoromethanesulfonyl)imide) dissolved in polyethylene glycol dimethyl ether (PEGDME, Mw=500) was injected into the separator (CELGARD® 3501).

The cathode-electrolyte assembly manufactured in Example 5 was disposed on the separator such that the cathode was exposed upward.

Next, a gas diffusion layer (GDL, 25BC, available from SGL) was attached to an upper surface of the cathode, a nickel mesh was disposed on the gas diffusion layer, and then a pressing member was disposed on the nickel mesh and then pressed to fix the cell and transport air to the cathode, thereby manufacturing a lithium-air battery. An example structure of the lithium-air battery is shown in FIG. 5.

Examples 10 to 12

Lithium-air batteries were manufactured in the same manner as in Example 9, except that the cathode-electrolyte assemblies of Examples 6 to 8 were used, respectively.

Comparative Example 3

A lithium-air battery was manufactured in the same manner as in Example 9, except that the cathode-electrolyte assembly of Comparative Example 2 was used.

Evaluation Example 1: Evaluation of Content Ratio of Polymer Electrolyte Membrane to Carbonaceous Core The carbonaceous cores coated with the single polymer bilayer or the pluralities of polymer bilayers of Preparation Examples 1 to 4 were analyzed by thermal gravity analysis (TGA) to evaluate the content of the polymer electrolyte membrane coated on each carbonaceous core. This evaluation was performed using one to three samples for each carbonaceous core having a specific number of polymer bilayers. The results are shown in FIG. 4.

Figure 4:
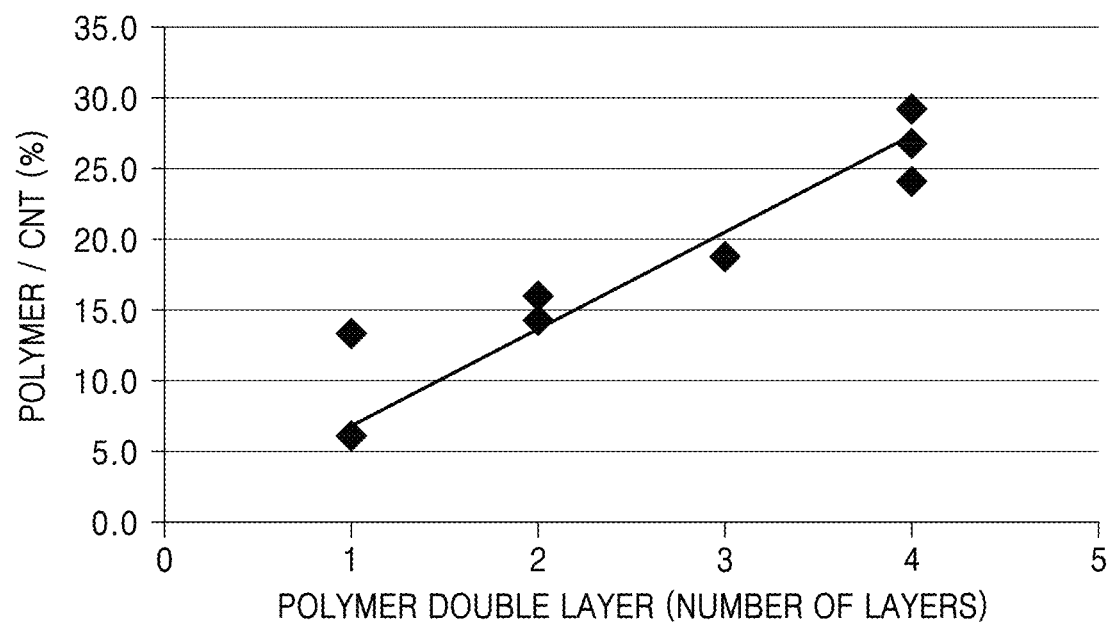
FIG. 4 is a graph of the content of a polymer electrolyte membrane as a percentage of the carbonaceous core (polymer/CNT, %) versus the number of polymer bilayers in the carbon composites, prepared in accordance with Preparation Examples 1 to 4.

Referring to FIG. 4, a content of the polymer electrolyte membrane as a percentage of the carbonaceous core (polymer/CNT×100%) increased linearly with an increasing number of polymer bilayer coatings.

For example, in the carbon composite of Preparation Example 1, the content of the coated polymer electrolyte membrane was about 5 parts to about 15 parts by weight with respect to 100 parts by weight of the carbonaceous core (MWCNTs).

Evaluation Example 2: Charge-Discharge Characteristics Evaluation

The lithium-air batteries of Example 12 and Comparative Example 3 were each subjected to a charge-discharge cycle of discharging with a constant current of about 0.24 mA/cm$^2$ at a temperature of about 80° C. under an oxygen atmosphere of about 1 atm until a voltage reached about 2.0 V (with respect to Li) and charging with the same current until a voltage reached about 4.3 V. The number of cycles at which 80% or greater of the initial discharge capacity (about 500 Wh/kg) at the 1$^{st}$ cycle was evaluated. The results are shown in Table 1.

TABLE 1

| Example | Number of cycles at which 80% or greater of the initial discharge capacity was maintained at 2.0 V (vs. Li) [times] |
| --- | --- |
| Example 12 | 7 |
| Comparative Example 3 | 1 |

Referring to Table 1, the lithium-air battery of Example 12 using the porous cathode including carbon composites having the polymer electrolyte membrane arranged on the carbonaceous core, the polymer electrolyte membrane including the plurality of polymer layers and the ionic liquid, was found to have remarkably improved lifetime characteristics, compared to the lithium-air battery of Comparative Example 3 using a cathode including only the carbonaceous core without a polymer electrolyte membrane.

As described above, according to the one or more embodiments, using a carbon composite obtained by coating a plurality of coating layers containing an ionic liquid on a carbonaceous core, a lithium-air battery may have improved lifetime characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A carbon composite comprising:
   a carbonaceous core; and
   a polymer electrolyte membrane disposed on the carbonaceous core, the polymer electrolyte membrane comprising
   a first ionic liquid,
   a first polymer layer disposed on the carbonaceous core and comprising a polymer having a backbone with a first ionic charge, and
   a second polymer layer disposed on the first polymer layer and comprising a polymer having a backbone with a second ionic charge, which is opposite to the first ionic charge of the backbone of the first polymer layer,
   wherein the carbonaceous core comprises a carbonaceous nanostructure comprising a first pore having an aspect ratio of about 5 or greater.

2. The carbon composite of claim 1, wherein the first pore has a diameter of about 0.5 nanometer to about 3 nanometers.

3. The carbon composite of claim 1, wherein the carbonaceous core is non-spherical and is substantially sulfur free.

4. The carbon composite of claim 1, wherein the carbon composite further comprises a second ionic liquid disposed on the carbonaceous core.

5. The carbon composite of claim 4, wherein the second ionic liquid is between the carbonaceous core and the first polymer layer.

6. The carbon composite of claim 1, wherein the polymer electrolyte membrane has a thickness of about 0.5 nanometer to about 1,000 nanometers.

7. The carbon composite of claim 1, wherein the polymer electrolyte membrane comprises a polymer bilayer comprising the first polymer layer and the second polymer layer in contact with each other, and the polymer bilayer has a thickness of about 0.5 nanometer to about 5 nanometers.

8. The carbon composite of claim 7, wherein the polymer electrolyte membrane comprises a plurality of polymer bilayers.

9. The carbon composite of claim 7, wherein the number of polymer bilayers in the plurality of polymer bilayers is linearly proportional to an amount of the polymer electrolyte membrane in the carbon composite.

10. The carbon composite of claim 1, wherein an amount of the polymer electrolyte membrane is about 0.1 part to about 100 parts by weight with respect to 100 parts by weight of the carbonaceous core.

11. The carbon composite of claim 1, wherein the polymer electrolyte membrane comprises a polymer which is electrochemically stable in a voltage range of about 1 volt to about 4.5 volts with respect to lithium metal and is substantially inert to lithium peroxide.

12. The carbon composite of claim 1, wherein the polymer electrolyte membrane comprises a polymer comprising a cationic polymeric ionic liquid, an anionic polymeric ionic liquid, a zwitterionic polymeric ionic liquid, a fluorine polymer, or a combination thereof.

13. An electrode comprising:
a porous layer comprising a plurality of carbon composites, a carbon composite of the plurality of carbon composites comprising
a carbonaceous core; and
a polymer electrolyte membrane disposed on the carbonaceous core, the polymer electrolyte membrane comprising
a first ionic liquid,
a first polymer layer disposed on the carbonaceous core and comprising a polymer having a backbone with a first ionic charge, and
a second polymer layer disposed on the first polymer layer and comprising a polymer having a backbone with a second ionic charge, which is opposite to the first ionic charge of the backbone of the first polymer layer,
wherein the carbonaceous core comprises a carbonaceous nanostructure comprising a first pore having an aspect ratio of about 5 or greater.

14. The electrode of claim 13, wherein the porous layer has a bimodal pore structure comprising a first pore and a second pore, wherein the first pore and the second pore have different sizes.

15. The electrode of claim 13, wherein the porous layer comprises a first pore present in the carbonaceous core and a second pore present between the plurality of carbon composites.

16. The electrode of claim 15, wherein the first pore has a diameter smaller than a diameter of the second pore.

17. The electrode of claim 15, wherein the first pore has a diameter of about 0.5 nanometer to about 2 nanometers, and the second pores have a diameter of about 5 nanometers to about 90 micrometers.

18. The electrode of claim 15, wherein the first pore has an aspect ratio of about 5 or greater.

19. The electrode of claim 15, wherein the first pore has a regular shape and the second pore has an irregular shape.

20. The electrode of claim 15, wherein a shape of the second pore is defined by a first carbon composite arranged in a first direction parallel to a length of the carbonaceous core, a second carbon composite arranged in a second direction different from the first direction and in contact with the first carbon composite, a third carbon composite arranged in a third direction different from the second direction and in contact with the second carbon composite, and a fourth carbon composite arranged in a fourth direction different from the third direction and in contact with the first carbon composite and the third carbon composite.

21. The electrode of claim 15, wherein the porous layer comprises a plurality of the second pore arranged in a non-periodical and disordered manner.

22. The electrode of claim 13, wherein the porous layer has a porosity of about 10% to about 90%.

23. The electrode of claim 13, wherein the plurality of carbon composites of the porous layer have a weight per unit area of about 0.1 milligram per square centimeter to about 20 milligrams per square centimeter.

24. The electrode of claim 13, wherein the carbonaceous core of the porous layer has a weight per unit area of about 0.1 milligram per square centimeter to about 10 milligrams per square centimeter.

25. The electrode of claim 13, wherein the polymer electrolyte membrane of the porous layer has a weight per unit area of about 0.01 milligram per square centimeter to about 10 milligrams per square centimeter.

26. The electrode of claim 13, wherein the porous layer has a thickness of about 10 micrometers or greater.

27. The electrode of claim 13, wherein a content of the first ionic liquid is about 100 parts by weight to about 200 parts by weight with respect to 100 parts by weight of the carbonaceous core.

28. The electrode of claim 13, further comprising a porous substrate supporting the porous layer, the porous substrate having a regular structure and a greater mechanical strength than the porous layer.

29. The electrode of claim 13, wherein the electrode is a cathode and oxygen is used as a cathode active material.

30. A lithium-air battery comprising:
a cathode; and
a lithium-containing anode,
wherein the cathode comprises
a porous layer comprising a plurality of carbon composites, a carbon composite of the plurality of carbon composites comprising
a carbonaceous core; and
a polymer electrolyte membrane disposed on the carbonaceous core, the polymer electrolyte membrane comprising
a first ionic liquid,
a first polymer layer disposed on the carbonaceous core and comprising a polymer having a backbone with a first ionic charge, and
a second polymer layer disposed on the first polymer layer and comprising a polymer having a backbone with a second ionic charge, which is opposite to the first ionic charge of the backbone of the first polymer layer,
wherein the carbonaceous core comprises a carbonaceous nanostructure comprising a first pore having an aspect ratio of about 5 or greater.

31. A method of preparing the carbon composite of claim 1, the method comprising:
coating a second ionic liquid on a carbonaceous core to prepare a coated carbonaceous core;
disposing the first polymer layer on the coated carbonaceous core to provide a first polymer layer on the coated carbonaceous core, wherein the first polymer layer comprises a polymer having a backbone with a first ionic charge, which is opposite to a third ionic charge of the second ionic liquid;
disposing a second polymer layer on the first polymer layer to provide a second polymer layer on the first polymer layer, wherein the second polymer layer comprises a polymer having a backbone with a second ionic charge, which is opposite to the first ionic charge of the backbone of the first polymer layer; and impregnating the first polymer layer and the second polymer layer with a first ionic liquid to prepare the carbon composite.

* * * * *